US011758551B2

(12) United States Patent
Sakhnini et al.

(10) Patent No.: US 11,758,551 B2
(45) Date of Patent: Sep. 12, 2023

(54) CANCELLATION OF TRANSMISSION OCCASIONS

(71) Applicant: QUALCOMM Incorporated, San Diego, CA (US)

(72) Inventors: Iyab Issam Sakhnini, San Diego, CA (US); Tao Luo, San Diego, CA (US); Junyi Li, Franklin Park, NJ (US); Olufunmilola Omolade Awoniyi-Oteri, San Diego, CA (US); Qiang Wu, San Diego, CA (US); Jelena Damnjanovic, Del Mar, CA (US); Wanshi Chen, San Diego, CA (US); Peter Gaal, San Diego, CA (US); Juan Montojo, San Diego, CA (US); Yan Zhou, San Diego, CA (US); Wooseok Nam, San Diego, CA (US); Hwan Joon Kwon, San Diego, CA (US); Mahmoud Taherzadeh Boroujeni, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 95 days.

(21) Appl. No.: 17/215,601

(22) Filed: Mar. 29, 2021

(65) Prior Publication Data
US 2021/0337586 A1 Oct. 28, 2021

Related U.S. Application Data

(60) Provisional application No. 63/015,151, filed on Apr. 24, 2020.

(51) Int. Cl.
H04W 72/23 (2023.01)
H04L 1/1812 (2023.01)

(52) U.S. Cl.
CPC .......... *H04W 72/23* (2023.01); *H04L 1/1812* (2013.01)

(58) Field of Classification Search
CPC .... H04L 1/1812; H04W 72/042; H04W 72/14
See application file for complete search history.

(56) References Cited

U.S. PATENT DOCUMENTS 10,674,528 B2 * 6/2020 Kunt .................... H04W 72/23
10,756,852 B2 * 8/2020 Babaei .................. H04L 1/1812
(Continued)

FOREIGN PATENT DOCUMENTS

BR 112021004405 A2 * 7/2021 ........... H04L 1/0003
CN 109417516 A * 3/2019 ........ H04W 72/1268
(Continued)

OTHER PUBLICATIONS

International Search Report and Written Opinion—PCT/US2021/024925—ISA/EPO—dated Jul. 22, 2021.

Primary Examiner — Eric Nowlin
(74) Attorney, Agent, or Firm — Danai Nelisile Mhembere; Holland & Hart LLP

(57) ABSTRACT

Methods, systems, and devices for wireless communications are described. A base station may dynamically cancel and reschedule configured transmission occasions for communicating with a user equipment (UE). The transmission occasions may be configured according to a semi-persistent scheduling (SPS) configuration (e.g., for downlink transmissions) or a configured grant (CG) configuration (e.g., for uplink transmissions). The base station may transmit a dynamic grant to the UE that indicates a cancellation of a transmission occasion and schedules a dynamic transmission occasion for communicating data scheduled for trans-
(Continued)

mission at the canceled transmission occasion. In some examples, the cancellation in the grant may be explicit or implicit.

30 Claims, 19 Drawing Sheets

(56) References Cited

U.S. PATENT DOCUMENTS

| | | | | |
|---|---|---|---|---|
| 10,820,342 | B2* | 10/2020 | Al-Imari | H04L 1/1822 |
| 11,357,017 | B2* | 6/2022 | Bagheri | H04L 5/0051 |
| 11,540,312 | B2* | 12/2022 | Al-Imari | H04W 48/16 |
| 2018/0368160 | A1* | 12/2018 | Kunt | H04W 72/23 |
| 2019/0253197 | A1* | 8/2019 | Babaei | H04L 1/188 |
| 2019/0254067 | A1* | 8/2019 | Al-Imari | H04L 1/1887 |
| 2020/0045724 | A1* | 2/2020 | Lu | H04W 28/0289 |
| 2020/0100279 | A1* | 3/2020 | Al-Imari | H04W 72/23 |
| 2020/0229202 | A1* | 7/2020 | Bagheri | H04W 72/0453 |
| 2020/0313793 | A1* | 10/2020 | Jung | H04L 5/0044 |
| 2020/0314917 | A1* | 10/2020 | Jeon | H04W 74/08 |
| 2020/0322971 | A1* | 10/2020 | Jung | H04L 5/003 |
| 2021/0014002 | A1* | 1/2021 | Lovlekar | H04L 1/08 |
| 2021/0120578 | A1* | 4/2021 | Katranaras | H04L 1/1614 |
| 2021/0144708 | A1* | 5/2021 | Wang | H04W 72/14 |
| 2021/0168783 | A1* | 6/2021 | Islam | H04W 72/042 |
| 2021/0168848 | A1* | 6/2021 | Chatterjee | H04W 72/1242 |
| 2022/0014314 | A1* | 1/2022 | Wang | H04W 72/1268 |
| 2022/0132555 | A1* | 4/2022 | Blankenship | H04L 1/1819 |
| 2022/0159683 | A1* | 5/2022 | Islam | H04W 72/0446 |
| 2022/0159698 | A1* | 5/2022 | Hosseini | H04W 72/0446 |
| 2022/0159701 | A1* | 5/2022 | Islam | H04L 5/0094 |
| 2022/0183050 | A1* | 6/2022 | Marco | H04W 72/569 |
| 2022/0217736 | A1* | 7/2022 | Taherzadeh Boroujeni | H04W 72/0446 |
| 2022/0232545 | A1* | 7/2022 | Mukherjee | H04W 74/0808 |
| 2022/0264608 | A1* | 8/2022 | Bae | H04W 72/1268 |
| 2022/0272714 | A1* | 8/2022 | Bagheri | H04W 72/0453 |
| 2022/0394753 | A1* | 12/2022 | Alabbasi | H04W 72/02 |
| 2022/0399964 | A1* | 12/2022 | Bhattad | H04L 1/1887 |

FOREIGN PATENT DOCUMENTS

| | | | | | |
|---|---|---|---|---|---|
| CN | 111226480 | A | * | 6/2020 | H04L 1/1819 |
| CN | 111713163 | A | * | 9/2020 | H04L 1/1822 |
| CN | 113287359 | A | * | 8/2021 | H04L 1/0068 |
| CN | 113785525 | A | * | 12/2021 | H04L 5/0053 |
| CN | 114616913 | A | * | 6/2022 | H04L 1/1812 |
| CN | 109417516 | B | * | 7/2022 | H04W 72/1268 |
| CN | 114731624 | A | * | 7/2022 | H04W 72/02 |
| EP | 3852476 | A1 | * | 7/2021 | H04L 1/0003 |
| EP | 4040900 | A1 | * | 8/2022 | |
| EP | 4055932 | A1 | * | 9/2022 | H04W 72/02 |
| GB | 2587665 | A | * | 4/2021 | H04W 52/146 |
| JP | 2023500473 | A | * | 1/2023 | |
| JP | 2023500878 | A | * | 1/2023 | |
| KR | 20220016047 | A | * | 2/2022 | |
| TW | I707601 | B | * | 10/2020 | |
| TW | 202106091 | A | * | 2/2021 | H04L 5/0053 |
| TW | I747049 | B | * | 11/2021 | |
| WO | WO-2018232205 | A1 | * | 12/2018 | H04W 72/1268 |
| WO | WO-2019158076 | A1 | * | 8/2019 | H04L 1/1822 |
| WO | WO-2020033660 | A1 | | 2/2020 | |
| WO | WO-2020063640 | A1 | * | 4/2020 | H04L 1/1819 |
| WO | WO-2020067515 | A1 | | 4/2020 | |
| WO | WO-2020067815 | A1 | * | 4/2020 | H04L 1/0018 |
| WO | WO-2020144529 | A1 | * | 7/2020 | H04L 1/0068 |
| WO | WO-2020194162 | A1 | * | 10/2020 | H04L 1/0013 |
| WO | WO-2020194258 | A1 | * | 10/2020 | H04L 1/1812 |
| WO | WO-2020223448 | A1 | * | 11/2020 | H04L 5/0053 |
| WO | WO-2020227103 | A1 | * | 11/2020 | H04L 1/1812 |
| WO | WO-2021002784 | A1 | * | 1/2021 | |
| WO | WO-2021066169 | A1 | * | 4/2021 | H04W 52/146 |
| WO | WO-2021091475 | A1 | * | 5/2021 | H04W 72/02 |
| WO | WO-2021092614 | A1 | * | 5/2021 | H04L 1/1812 |
| WO | WO-2021159057 | A1 | * | 8/2021 | |
| WO | WO-2022061634 | A1 | * | 3/2022 | |

\* cited by examiner

CANCELLATION OF TRANSMISSION OCCASIONS

CROSS REFERENCE

The present application for patent claims the benefit of U.S. Provisional Patent Application No. 63/015,151 by SAKHNINI et al., entitled "CANCELLATION OF TRANSMISSION OCCASIONS," filed Apr. 24, 2020, assigned to the assignee hereof, and expressly incorporated by reference.

FIELD OF TECHNOLOGY

The following relates generally to wireless communications and more specifically to cancellation of transmission occasions.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A UE may communicate with a base station in configured transmission occasions. For example, the base station may employ a semi-persistent scheduling (SPS) configuration for downlink transmissions to the UE, or the base station may employ a configured grant (CG) configuration for uplink transmissions from the UE.

SUMMARY

The described techniques relate to improved methods, systems, devices, and apparatuses that support cancellation of transmission occasions. Generally, the described techniques provide for enabling a base station to dynamically cancel and reschedule configured transmission occasions for communicating with a user equipment (UE). The transmission occasions may be configured according to a semi-persistent scheduling (SPS) configuration (e.g., for downlink transmissions) or a configured grant (CG) configuration (e.g., for uplink transmissions). The base station may transmit a dynamic grant to the UE that indicates a cancellation of a transmission occasion and schedules a dynamic transmission occasion for communicating data scheduled for transmission at the canceled transmission occasion. In some examples, the cancellation may be explicit, where the grant includes one or more bits identifying the canceled transmission occasion. Additionally or alternatively, the cancellation may be implicit. For example, the base station may determine a process identifier for the canceled transmission occasion. The dynamic grant may indicate the process identifier when scheduling the dynamic transmission occasion. Based on the indicated process identifier, the UE may determine that the configured transmission occasion with the indicated process identifier is to be canceled and the data scheduled for transmission at the canceled transmission occasion is rescheduled for transmission at the dynamic transmission occasion.

A method of wireless communications at a UE is described. The method may include determining a configuration for a set of transmission occasions for communications with a base station, the configuration including a periodicity and an offset associated with each transmission occasion of the set of transmission occasions, receiving, from the base station, a grant that indicates a cancellation of a transmission occasion of the set of transmission occasions and schedules a dynamic transmission occasion to reschedule a transmission of information associated with the canceled transmission occasion, and communicating the information with the base station at the dynamic transmission occasion based on receiving the grant.

An apparatus for wireless communications at a UE is described. The apparatus may include a processor, memory coupled with the processor, and instructions stored in the memory. The instructions may be executable by the processor to cause the apparatus to determine a configuration for a set of transmission occasions for communications with a base station, the configuration including a periodicity and an offset associated with each transmission occasion of the set of transmission occasions, receive, from the base station, a grant that indicates a cancellation of a transmission occasion of the set of transmission occasions and schedules a dynamic transmission occasion to reschedule a transmission of information associated with the canceled transmission occasion, and communicate the information with the base station at the dynamic transmission occasion based on receiving the grant.

Another apparatus for wireless communications at a UE is described. The apparatus may include means for determining a configuration for a set of transmission occasions for communications with a base station, the configuration including a periodicity and an offset associated with each transmission occasion of the set of transmission occasions, receiving, from the base station, a grant that indicates a cancellation of a transmission occasion of the set of transmission occasions and schedules a dynamic transmission occasion to reschedule a transmission of information associated with the canceled transmission occasion, and communicating the information with the base station at the dynamic transmission occasion based on receiving the grant.

A non-transitory computer-readable medium storing code for wireless communications at a UE is described. The code may include instructions executable by a processor to determine a configuration for a set of transmission occasions for communications with a base station, the configuration including a periodicity and an offset associated with each transmission occasion of the set of transmission occasions, receive, from the base station, a grant that indicates a cancellation of a transmission occasion of the set of transmission occasions and schedules a dynamic transmission occasion to reschedule a transmission of information associated with the canceled transmission occasion, and communicate the information with the base station at the dynamic transmission occasion based on receiving the grant.

Some examples of the method, apparatuses, and non-transitory computer-readable medium described herein may further include operations, features, means, or instructions for refraining from communicating the information with the base station in resources associated with the configuration at the canceled transmission occasion based on receiving the grant, where communicating the information with the base station at the dynamic transmission occasion may be based on refraining from communicating the information.

Some examples of the method, apparatuses, and non-transitory computer-readable medium described herein may further include operations, features, means, or instructions for determining an identifier associated with the canceled transmission occasion based on receiving the grant, and determining that the identifier may be associated with the dynamic transmission occasion based on determining the identifier, where refraining from communicating with the base station at the canceled transmission occasion may be based on determining that the identifier may be associated with the dynamic transmission occasion.

In some examples of the method, apparatuses, and non-transitory computer-readable medium described herein, the identifier includes a hybrid automatic repeat request (HARQ) process identifier.

In some examples of the method, apparatuses, and non-transitory computer-readable medium described herein, the received grant includes one or more bits identifying the canceled transmission occasion.

Some examples of the method, apparatuses, and non-transitory computer-readable medium described herein may further include operations, features, means, or instructions for identifying, in the received grant, an indication of a set of canceled transmission occasions, where the set of canceled transmission occasions include the canceled transmission occasion.

Some examples of the method, apparatuses, and non-transitory computer-readable medium described herein may further include operations, features, means, or instructions for refraining from communicating with the base station in resources associated with the configuration at the set of canceled transmission occasions based on receiving the grant.

In some examples of the method, apparatuses, and non-transitory computer-readable medium described herein, the set of canceled transmission occasions may be consecutive in the set of transmission occasions or non-consecutive in the set of transmission occasions.

In some examples of the method, apparatuses, and non-transitory computer-readable medium described herein, the set of canceled transmission occasions may be based on a set of cancellations in the indication, the set of cancellations based on a pattern associated with the set of transmission occasions.

Some examples of the method, apparatuses, and non-transitory computer-readable medium described herein may further include operations, features, means, or instructions for receiving a second grant that indicates the UE may be to resume communicating with the base station in resources associated with the configuration, where communicating with the base station at the dynamic transmission occasion may be based on receiving the second grant.

In some examples of the method, apparatuses, and non-transitory computer-readable medium described herein, determining the configuration may include operations, features, means, or instructions for determining a scheduling associated with SPS occasions for downlink transmissions to the UE, where the set of transmission occasions include a set of SPS occasions for downlink transmissions.

In some examples of the method, apparatuses, and non-transitory computer-readable medium described herein, determining the configuration may include operations, features, means, or instructions for determining a scheduling associated with CG occasions for uplink transmissions from the UE, where the set of transmission occasions include a set of CG occasions for uplink transmissions.

Some examples of the method, apparatuses, and non-transitory computer-readable medium described herein may further include operations, features, means, or instructions for identifying, in the received grant, downlink control information (DCI) that indicates the cancellation and schedules the dynamic transmission occasion, where communicating at the dynamic transmission occasion may be based on identifying the DCI.

In some examples of the method, apparatuses, and non-transitory computer-readable medium described herein, the grant that indicates the cancellation of the transmission occasion of the set of transmission occasions and schedules the dynamic transmission occasion to transmit information associated with the canceled transmission occasion for a set of UEs, the set of UEs including the UE.

Some examples of the method, apparatuses, and non-transitory computer-readable medium described herein may further include operations, features, means, or instructions for transmitting a message to the base station requesting to cancel the transmission occasion, where receiving the grant may be based on transmitting the message.

Some examples of the method, apparatuses, and non-transitory computer-readable medium described herein may further include operations, features, means, or instructions for determining a set of repetitions associated with the canceled transmission occasion, where the indicated cancellation identifies one or more repetitions of the set of repetitions.

Some examples of the method, apparatuses, and non-transitory computer-readable medium described herein may further include operations, features, means, or instructions for refraining from communicating with the base station at the one or more repetitions based on receiving the grant.

A method of wireless communications at a base station is described. The method may include determining a configuration for a set of transmission occasions for communications with a UE, the configuration including a periodicity and an offset associated with each transmission occasion of the set of transmission occasions, transmitting, to the UE, a grant that indicates a cancellation of a transmission occasion of the set of transmission occasions and schedules a dynamic transmission occasion to reschedule a transmission of information associated with the canceled transmission occasion, and communicating the information with the UE at the dynamic transmission occasion based on transmitting the grant.

An apparatus for wireless communications at a base station is described. The apparatus may include a processor, memory coupled with the processor, and instructions stored in the memory. The instructions may be executable by the processor to cause the apparatus to determine a configuration for a set of transmission occasions for communications with a UE, the configuration including a periodicity and an offset associated with each transmission occasion of the set of transmission occasions, transmit, to the UE, a grant that indicates a cancellation of a transmission occasion of the set of transmission occasions and schedules a dynamic transmission occasion to reschedule a transmission of information associated with the canceled transmission occasion, and communicate the information with the UE at the dynamic transmission occasion based on transmitting the grant.

Another apparatus for wireless communications at a base station is described. The apparatus may include means for determining a configuration for a set of transmission occasions for communications with a UE, the configuration including a periodicity and an offset associated with each transmission occasion of the set of transmission occasions, transmitting, to the UE, a grant that indicates a cancellation of a transmission occasion of the set of transmission occasions and schedules a dynamic transmission occasion to reschedule a transmission of information associated with the canceled transmission occasion, and communicating the information with the UE at the dynamic transmission occasion based on transmitting the grant.

A non-transitory computer-readable medium storing code for wireless communications at a base station is described. The code may include instructions executable by a processor to determine a configuration for a set of transmission occasions for communications with a UE, the configuration including a periodicity and an offset associated with each transmission occasion of the set of transmission occasions, transmit, to the UE, a grant that indicates a cancellation of a transmission occasion of the set of transmission occasions and schedules a dynamic transmission occasion to reschedule a transmission of information associated with the canceled transmission occasion, and communicate the information with the UE at the dynamic transmission occasion based on transmitting the grant.

Some examples of the method, apparatuses, and non-transitory computer-readable medium described herein may further include operations, features, means, or instructions for determining a first priority associated with the canceled transmission occasion and a second priority associated with a communication with a second UE, where the second priority may be greater than the first priority, where transmitting the grant may be based on determining the first priority and the second priority.

Some examples of the method, apparatuses, and non-transitory computer-readable medium described herein may further include operations, features, means, or instructions for refraining from communicating the information with the UE in resources associated with the configuration at the canceled transmission occasion based on receiving the grant, where communicating the information with the base station at the dynamic transmission occasion may be based on refraining from communicating the information.

Some examples of the method, apparatuses, and non-transitory computer-readable medium described herein may further include operations, features, means, or instructions for determining an identifier associated with the canceled transmission occasion based on transmitting the grant, and transmitting an indication in the transmitted grant that the identifier may be associated with the dynamic transmission occasion, where refraining from communicating with the UE at the canceled transmission occasion may be based on the indication that the identifier may be associated with the dynamic transmission occasion.

In some examples of the method, apparatuses, and non-transitory computer-readable medium described herein, the identifier includes a HARQ process identifier.

In some examples of the method, apparatuses, and non-transitory computer-readable medium described herein, the transmitted grant includes one or more bits identifying the canceled transmission occasion.

Some examples of the method, apparatuses, and non-transitory computer-readable medium described herein may further include operations, features, means, or instructions for transmitting, in the transmitted grant an indication of a set of canceled transmission occasions, where the set of canceled transmission occasions include the canceled transmission occasion.

Some examples of the method, apparatuses, and non-transitory computer-readable medium described herein may further include operations, features, means, or instructions for refraining from communicating with the UE in resources associated with the configuration at the set of canceled transmission occasions based on transmitting the indication in the transmitted grant.

In some examples of the method, apparatuses, and non-transitory computer-readable medium described herein, the set of canceled transmission occasions may be consecutive in the set of transmission occasions or non-consecutive in the set of transmission occasions.

In some examples of the method, apparatuses, and non-transitory computer-readable medium described herein, the set of canceled transmission occasions may be based on a set of cancellations in the indication, the set of cancellations based on a pattern associated with the set of transmission occasions.

Some examples of the method, apparatuses, and non-transitory computer-readable medium described herein may further include operations, features, means, or instructions for transmitting a second grant that indicates the UE may be to resume communicating with the base station in resources associated with the configuration, where communicating with the UE at the dynamic transmission occasion may be based on transmitting the second grant.

In some examples of the method, apparatuses, and non-transitory computer-readable medium described herein, determining the configuration may include operations, features, means, or instructions for determining a scheduling associated with SPS occasions for downlink transmissions to the UE, where the set of transmission occasions include a set of SPS occasions for downlink transmissions.

In some examples of the method, apparatuses, and non-transitory computer-readable medium described herein, determining the configuration may include operations, features, means, or instructions for determining a scheduling associated with CG occasions for uplink transmissions from the UE, where the set of transmission occasions include a set of CG occasions for uplink transmissions.

Some examples of the method, apparatuses, and non-transitory computer-readable medium described herein may further include operations, features, means, or instructions for transmitting, in the transmitted grant, DCI that indicates the cancellation and schedules the dynamic transmission occasion, where communicating at the dynamic transmission occasion may be based on transmitting the DCI.

Some examples of the method, apparatuses, and non-transitory computer-readable medium described herein may further include operations, features, means, or instructions for transmitting the grant to one or more additional UEs, refraining from communicating with the one or more additional UEs at the canceled transmission occasion based on transmitting the grant, and communicating with the one or more additional UEs at the dynamic transmission occasion based on transmitting the grant.

In some examples of the method, apparatuses, and non-transitory computer-readable medium described herein, the transmitted grant indicates one or more second cancellations of one or more second transmission occasions of the set of transmission occasions.

Some examples of the method, apparatuses, and non-transitory computer-readable medium described herein may further include operations, features, means, or instructions for receiving a message from the UE requesting to cancel the transmission occasion, where transmitting the grant may be based on receiving the message.

Some examples of the method, apparatuses, and non-transitory computer-readable medium described herein may further include operations, features, means, or instructions for determining a set of repetitions associated with the canceled transmission occasion, where the indicated cancellation identifies one or more repetitions of the set of repetitions.

Some examples of the method, apparatuses, and non-transitory computer-readable medium described herein may further include operations, features, means, or instructions for refraining from communicating with the UE at the one or more repetitions based on transmitting the grant.

DETAILED DESCRIPTION

Figure 1:
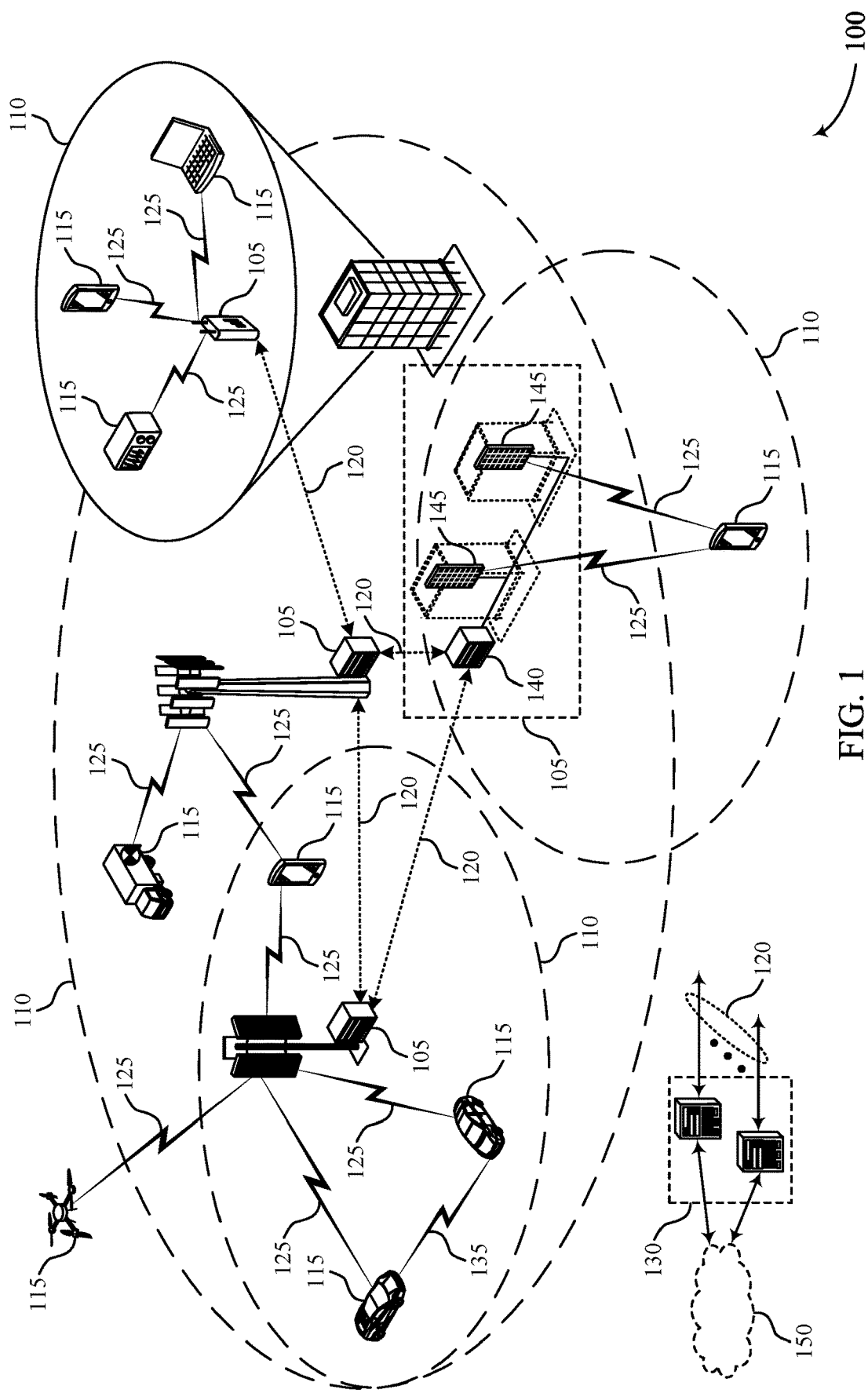
FIGS. 1 and 2 illustrate examples of wireless communications systems in accordance with aspects of the present disclosure.

A user equipment (UE) in a wireless communications system may communicate with one or more network nodes such as base stations. Communications may include downlink transmissions from a base station to the UE and uplink transmission from the UE to the base station.

In some examples, a base station may configure a set of transmission occasions for communicating with a UE to improve resource efficiency. For example, the base station may configure resources for downlink transmissions to the UE according to a semi-persistent scheduling (SPS) configuration. The downlink transmissions may include data transmissions, such as a physical downlink shared channel (PDSCH) transmission. Additionally or alternatively, the base station may configure resources for uplink transmissions from the UE according to a configured grant (CG) configuration. The uplink transmissions may include data transmissions, such as a physical uplink shared channel (PUSCH) transmission. The base station may configure the set of transmission occasions with a periodicity and an offset according to an SPS configuration or a CG configuration. If a data transmission (e.g., a downlink transmission or an uplink transmission) fails in a configured transmission occasion, the base station may transmit a dynamic grant scheduling a dynamic transmission occasion for retransmitting the data.

In some examples, a wireless communications system may include multiple UEs configured with SPS or CG resources. Based on the periodicities of the SPS or CG resources, the transmission occasion configurations may impact the ability of the system to accommodate transmissions with different priorities. For example, a base station may determine that a first UE is scheduled for a first communication in a set of resources at a configured transmission occasion. The base station may also determine that a second communication with a second UE has a higher priority than the first communication with the first UE. In some examples, the base station may multiplex the first communication and the second communication. However, multiplexing the communications may not be effective, for example, in cases when beams associated with the transmissions may be pointed in different directions. In some examples, the base station may determine to adjust a beam configuration to perform the second communication (e.g., the communication with a higher priority) with the second UE. If the base station does not inform the first UE of the adjustment, however, the first UE may attempt to perform the first communication and fail, which may reduce communications reliability and power efficiency at the first UE.

According the techniques described herein, a base station may dynamically cancel and reschedule configured transmission occasions for communicating with a UE. The transmission occasions may be configured according to an SPS configuration (e.g., for downlink transmissions) or a CG configuration (e.g., for uplink transmissions). The base station may transmit a dynamic grant to the UE that indicates a cancellation of a transmission occasion and schedules a dynamic transmission occasion for communicating data scheduled for transmission at the canceled transmission occasion.

In some examples, the cancellation may be explicit, where the grant includes one or more bits identifying the canceled transmission occasion. Additionally or alternatively, the cancellation may be implicit. For example, the base station may determine a process identifier (e.g., a hybrid automatic repeat request (HARQ) process identifier) for the canceled transmission occasion. The dynamic grant may indicate the process identifier when scheduling the dynamic transmission occasion. Based on the indicated process identifier, the UE may determine that the configured transmission occasion with the indicated process identifier is to be canceled and the data scheduled for transmission at the canceled transmission occasion is rescheduled for transmission at the dynamic transmission occasion.

Aspects of the disclosure are initially described in the context of wireless communications systems. Example transmission schemes and an example process flow are then described. Aspects of the disclosure are further illustrated by and described with reference to apparatus diagrams, system diagrams, and flowcharts that relate to cancellation of transmission occasions.

FIG. 1 illustrates an example of a wireless communications system 100 in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. HARQ feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

According the techniques described herein, a base station 105 may dynamically cancel and reschedule configured transmission occasions for communicating with a UE 115. The transmission occasions may be configured according to an SPS configuration (e.g., for downlink transmissions) or a CG configuration (e.g., for uplink transmissions). The base station 105 may transmit a dynamic grant to the UE 115 that indicates a cancellation of a transmission occasion and schedules a dynamic transmission occasion for communicating data scheduled for transmission at the canceled transmission occasion. In some examples, the cancellation may be explicit, where the grant includes one or more bits identifying the canceled transmission occasion. Additionally or alternatively, the cancellation may be implicit. For example, the base station 105 may determine a process identifier (e.g., a HARQ process identifier) for the canceled transmission occasion. The dynamic grant may indicate the process identifier when scheduling the dynamic transmission occasion. Based on the indicated process identifier, the UE 115 may determine that the configured transmission occasion with the indicated process identifier is to be canceled and the data scheduled for transmission at the canceled transmission occasion is rescheduled for transmission at the dynamic transmission occasion.

Figure 2:
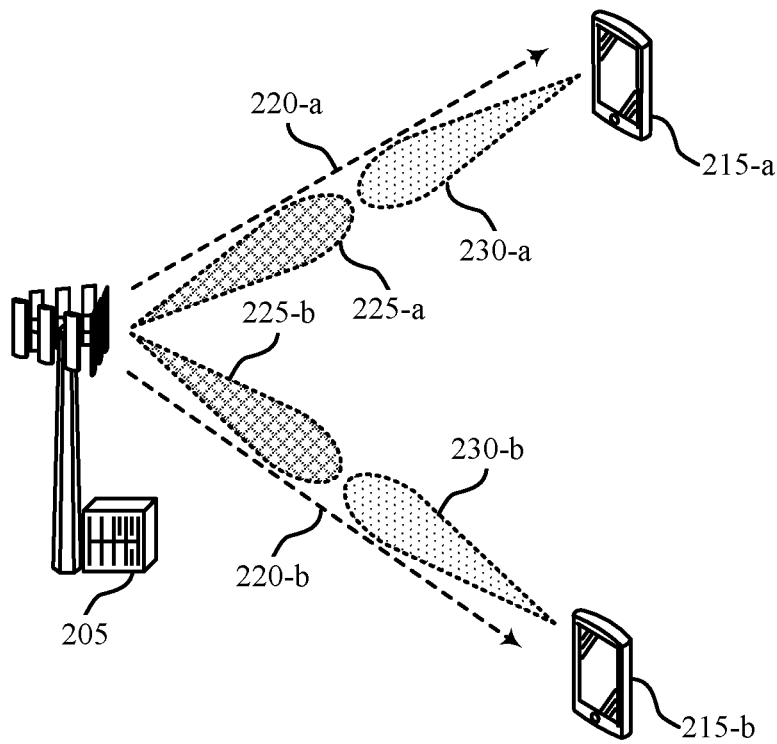

FIG. 2 illustrates an example of a wireless communications system 200 in accordance with aspects of the present disclosure. In some examples, the wireless communications system 200 may implement aspects of wireless communications system 100. For example, the wireless communications system 200 may include a base station 205 and UEs 215, which may be examples of the corresponding devices described with reference to FIG. 1. The wireless communications system 200 may include features for improved configuration of transmission occasions, among other benefits.

The base station 205 may communicate with the UEs 215 using beamforming techniques. For example, the base station 205 and the UE 215-a may communicate via a base station beam 225-a and a UE beam 230-a, and the base station 205 and the UE 215-b may communicate via a base station beam 225-b and a UE beam 230-b. In some examples, the communications illustrated in FIG. 2 may include downlink transmissions to the UEs 215, where the base station beams 225 may be transmission beams and the UE beams may be reception beams. Additionally or alternatively, the communications illustrated in FIG. 2 may include uplink transmissions to the UEs 215, where the base station beams 225 may be reception beams and the UE beams 230 may be transmission beams.

In some examples, the base station 205 may configure a set of transmission occasions for communicating data with the UE 215-*a* to improve resource efficiency. For example, the base station 205 may configure resources for downlink transmissions (e.g., PDSCH transmissions) to the UE 215-*a* according to an SPS configuration. Additionally or alternatively, the base station 205 may configure resources for uplink transmissions (e.g., PUSCH transmissions) from the UE 215-*a* according to a CG configuration. The base station 205 may configure the set of transmission occasions with a periodicity and an offset according to an SPS configuration or a CG configuration. If a data transmission (e.g., a downlink transmission or an uplink transmission) fails in a configured transmission occasion, the base station 205 may transmit a dynamic grant to the UE 215-*a* scheduling a dynamic transmission occasion for retransmitting the data.

Each transmission occasion may be configured with a HARQ process identifier to identify data with a configured transmission occasion. The HARQ process identifier may be based on the periodicity configured for the set of transmission occasions. In some examples, the UE 215-*a* may determine a HARQ process identifier for an SPS transmission occasion in a slot (which may be identified by a parameter CURRENT_slot) based on the formula [floor (CURRENT_slot×10/(numberOfSlotsPerFrame×periodicity))] modulo nrofHARQ-Processes, where the parameter numberOfSlotsPerFrame represents a configured number of consecutive slots (e.g., 10 or 20) in a frame, and the parameter nrofHARQ-Processes represents the quantity of HARQ processes configured for the set of transmission occasions. In some examples, the UE 215-*a* may determine a HARQ process identifier for a CG transmission occasion in a symbol (which may be identified by a parameter CURRENT_symbol) based on the formula [floor(CURRENT_symbol/periodicity)] modulo nrofHARQ-Processes.

In an SPS configuration, the base station 205 may or may not transmit downlink data at a configured transmission occasion, but in either case the UE 215-*a* may attempt to decode a PDSCH transmission at the configured transmission occasion. If the UE 215-*a* does not receive data, the UE 215-*a* may transmit a HARQ negative acknowledgment (NACK) corresponding to the configured transmission occasion.

In a CG configuration, the UE 215-*a* may transmit uplink data at the configured transmission occasion. Each HARQ process identifier may be associated with a timer, which may be referred to as a configuredGrantTimer. In some examples, the timer may be configured based on an RRC configuration message. The timer may start after an uplink transmission on a HARQ process. The UE 215-*a* may not transmit additional uplink data on a HARQ process until the associated timer expires.

In some examples, a base station 205 may determine to cancel a transmission occasion for the UE 215-*a*. For example, the base station 205 may determine that a communication with the UE 215-*b* has a higher priority than a communication with the UE 215-*a* that is scheduled in a configured transmission occasion. The base station 205 may adjust an antenna configuration to communicate with the UE 215-*b* via the base station beam 225-*b* in resources (e.g., time and frequency resources) associated with the configured transmission occasion based on the determined priority. If the base station 205 does not inform the UE 215-*a* of the adjustment, however, the UE 215-*a* may attempt to communicate with the base station 205 in the resources associated with the configured transmission occasion. For example, if the configured transmission occasion is an SPS transmission occasion, the UE 215-*a* may attempt to decode a PDSCH and transmit a HARQ NACK when the decoding fails. Similarly, if the configured transmission occasion is a CG transmission occasion, the UE 215-*a* may transmit a PUSCH transmission. The base station 205 may fail to receive the PUSCH transmission and accordingly schedule a retransmission to receive the data.

According the techniques described herein, the base station 205 may dynamically cancel and reschedule configured transmission occasions for communicating with the UE 215-*a*. The base station 205 may transmit signaling 220-*a* to the UE 215-*a*. The signaling 220-*a* may include a grant (e.g., a dynamic grant) that indicates a cancellation of a transmission occasion and schedules a dynamic transmission occasion for communicating information (e.g., data) scheduled for transmission at the canceled transmission occasion. In some examples, the base station 205 may indicate the cancellation in a downlink control information (DCI) message in the grant. For example, the base station 205 may indicate the cancellation of a PDSCH transmission at an SPS transmission occasion in a downlink DCI message such as a format 1_x DCI message. Additionally or alternatively, the base station 205 may indicate the cancellation of a PUSCH transmission at a CG transmission occasion in an uplink DCI message such as a format 0_x DCI message.

Based on receiving the grant in the signaling 220-*a*, the UE 215-*a* may cancel a communication at the canceled transmission occasion. For example, the UE 215-*a* may refrain from attempting to decode a PDSCH transmission or refrain from transmitting a PUSCH transmission in resources associated with the canceled transmission occasion. The UE 215-*a* may communicate the information with the base station 205 in resources associated with the dynamic transmission occasion indicated in the grant.

In some examples, the cancellation may be explicit, where the grant may include one or more bits identifying the canceled transmission occasion. Additionally or alternatively, the cancellation may be implicit. For example, the base station 205 may determine an identifier (e.g., a HARQ process identifier) for the canceled transmission occasion. The grant may indicate the identifier when scheduling the dynamic transmission occasion. Based on the indicated identifier, the UE 215-*a* may determine that the configured transmission occasion with the indicated identifier is to be canceled and the information scheduled for transmission at the canceled transmission occasion is rescheduled for transmission at the dynamic transmission occasion.

In some examples, the base station 205 may determine that a communication with the UE 215-*b* has a higher priority than a communication with the UE 215-*a* that is scheduled in a configured transmission occasion. Accordingly, the base station 205 may transmit a grant in the signaling 220-*a* that indicates a cancellation of the communication with the UE 215-*a* in the configured transmission occasion and reschedules the communication in resources associated with a dynamic transmission occasion.

In some examples, the base station 205 may indicate multiple cancellations of a set of configured transmission occasions. For example, the base station 205 may indicate cancellations of a quantity of consecutive transmission occasions and reschedule associated data transmissions at dynamic transmission occasions. Additionally or alternatively, the base station 205 may indicate cancellations of a quantity of non-consecutive transmission occasions, for example based on a pattern indicated in the grant. In some examples, the base station 205 may indicate in the grant that the UE 215-*a* is to cancel communications in resources associated with the configured set transmission occasions until a second grant is received that indicated the communications are to resume.

In some examples, the base station 205 may determine to cancel transmission occasions for multiple UEs, including the UE 215-*a* and the UE 215-*b*. For example, the base station 205 may determine a communication with another UE 215 (not shown) has a higher priority than communications at transmission occasions for the UE 215-*a* and the UE 215-*b*. In some examples, the base station 205 may separately cancel transmission occasions for each of the UE 215-*a* and the UE 215-*b*. The base station 205 may transmit a first grant in the signaling 220-*a* that indicates a cancellation of a first communication with the UE 215-*a* in a first transmission occasion and reschedules the first communication in resources associated with a first dynamic transmission occasion. The base station may also transmit a second grant in signaling 220-*b* that indicates a cancellation of a second communication with the UE 215-*b* in a second transmission occasion and reschedules the second communication in resources associated with a second dynamic transmission occasion. Additionally or alternatively, the base station 205 may concurrently cancel transmission occasions for the UE 215-*a* and the UE 215-*b* in a single grant. The base station may transmit the grant in the signaling 220-*a* and the signaling 220-*b*, where the grant may indicate the cancellation of the communications with the UEs 215-*a* and 215-*b* in the transmission occasions and reschedules the communications in the resources associated with the dynamic transmission occasions.

In some examples, the UE 215-*a* may transmit a request to the base station 205 that a transmission occasion be canceled and rescheduled. For example, the UE 215-*a* may determine that the UE 215-*a* has no data to transmit at a CG transmission occasion, and may request that the CG transmission occasion be canceled to improve resource efficiency at the UE 215-*a*. Based on the request from the UE 215-*a*, the base station 205 may transmit a grant in the signaling 220-*a* indicating a cancellation of the transmission occasion identified in the request.

In some examples, the UE 215-*a* may be configured to communicate with the base station 205 in resources associated with a set of repetitions at a transmission occasion. In some examples, the base station 205 may determine to cancel and reschedule one or more repetitions at the transmission occasion. The base station 205 may indicate to the UE 215-*a* which repetitions at the transmission occasion are canceled and rescheduled. In some examples, the base station 205 may indicate a cancellation of the set of repetitions at the transmission occasion.

Figure 3:
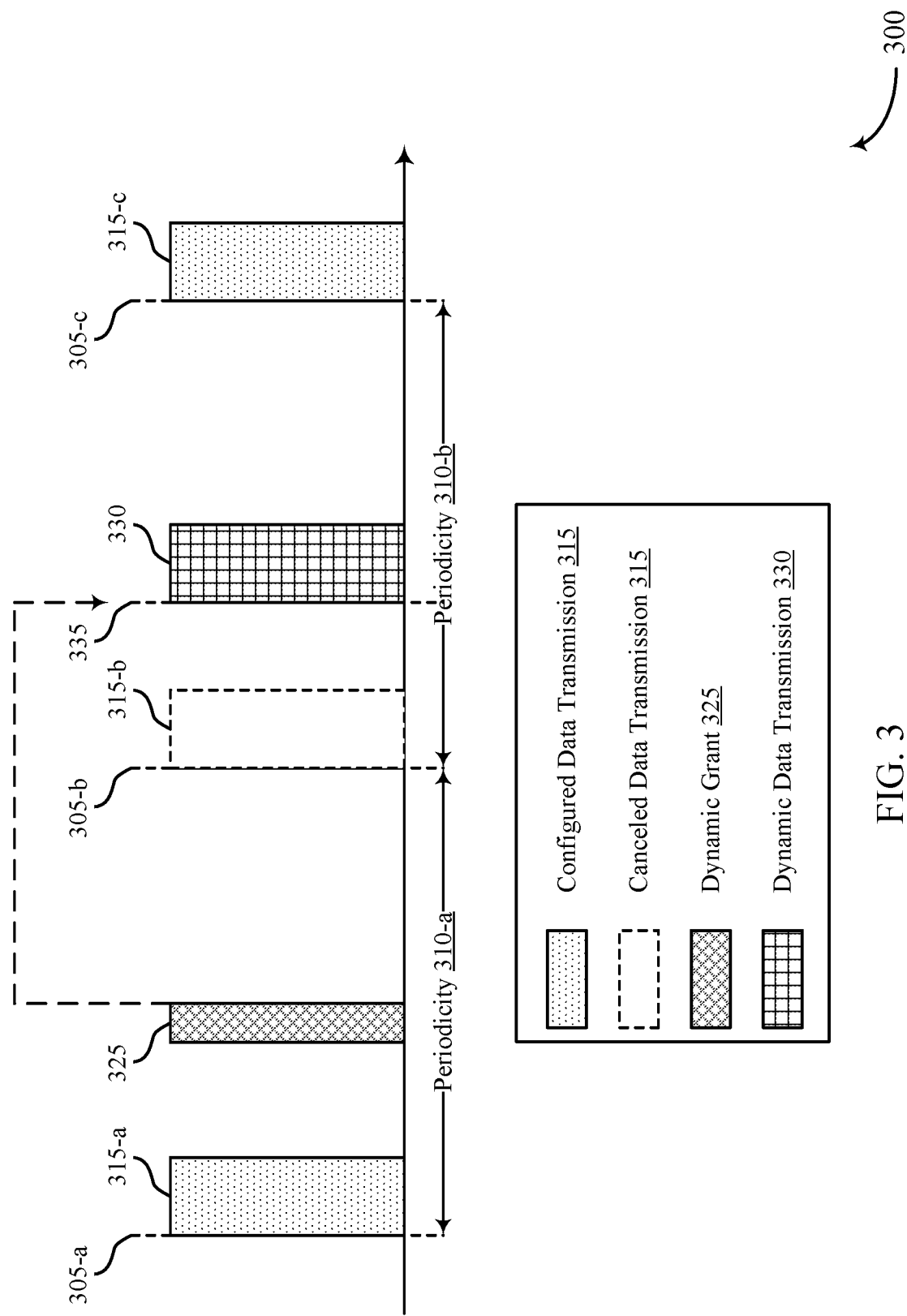
FIGS. 3 and 4 illustrate examples of transmission schemes in accordance with aspects of the present disclosure.

FIG. 3 illustrates an example of a transmission scheme 300 in accordance with aspects of the present disclosure. In some examples, the transmission scheme 300 may implement aspects of wireless communications systems 100 and 200. For example, the transmission scheme 300 may be associated with communications between a UE and a base station, which may be examples of corresponding devices described with reference to FIGS. 1 and 2. The transmission scheme 300 may illustrate features for improved configuration of transmission occasions, among other benefits.

A base station may configure resources at transmission occasions 305 for communicating with a UE in configured data transmissions 315 to improve resource efficiency. For example, the base station may communicate with the UE in a configured data transmission 315-*a* in resources associated with a transmission occasion 305-*a*. In some examples, the configured data transmissions 315 may include downlink transmissions (e.g., PDSCH transmissions) from the base station to the UE at the transmission occasions 305 according to an SPS configuration. Additionally or alternatively, the configured data transmissions 315 may include uplink transmissions (e.g., PUSCH transmissions) from the UE to the base station at the transmission occasions 305 according to a CG configuration. The configuration for the transmission occasions 305 may specify a periodicity 310 and an offset according to an SPS configuration or a CG configuration.

The base station may determine to cancel a configured data transmission 315-*b* at a transmission occasion 305-*b*. For example, the base station may determine that a communication with another UE has a higher priority than the configured data transmission 315-*b*. Additionally or alternatively, the UE may transmit a request to the base station that the configured data transmission 315-*b* be canceled and rescheduled.

The base station may transmit a dynamic grant 325 that indicates a cancellation of the configured data transmission 315-*b* at the transmission occasion 305-*b* and schedules a dynamic data transmission 330 at a dynamic transmission occasion 335. As illustrated in FIG. 3, the dynamic transmission occasion 335 may be within a periodicity 310-*b* following the transmission occasion 305-*b*. Based on the grant, the UE may refrain from communicating with the base station in resources associated with the canceled data transmission 315-*b*. In some examples, the base station may perform a higher priority communication with another UE in the resources associated with the canceled data transmission 315-*b* at the transmission occasion 305-*b*.

Figure 4:
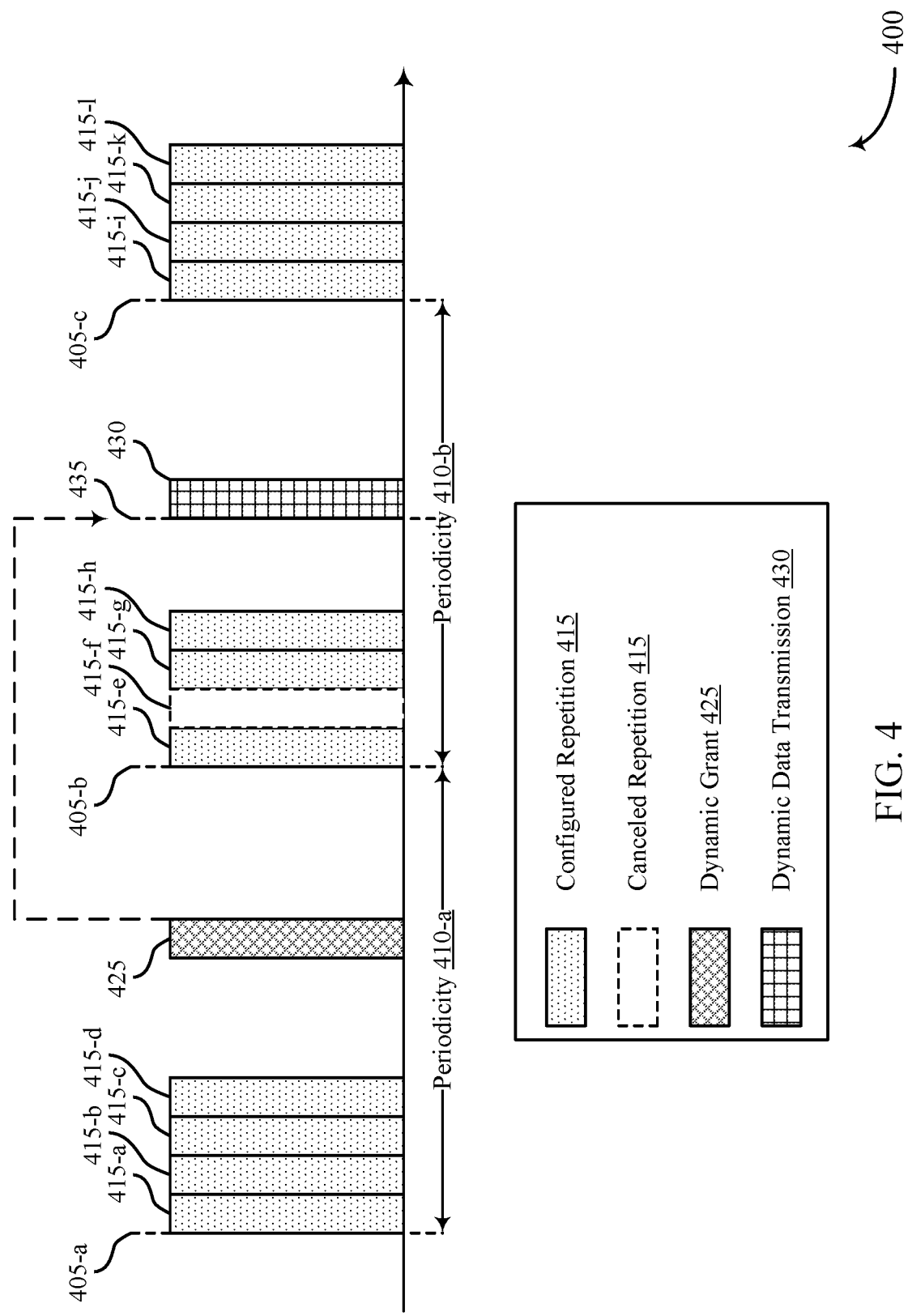

FIG. 4 illustrates an example of a transmission scheme 400 in accordance with aspects of the present disclosure. In some examples, the transmission scheme 400 may implement aspects of wireless communications systems 100 and 200. For example, the transmission scheme 400 may be associated with communications between a UE and a base station, which may be examples of corresponding devices described with reference to FIGS. 1 and 2. The transmission scheme 400 may illustrate features for improved configuration of transmission occasions, among other benefits.

A base station may configure resources at transmission occasions 405 for communicating with a UE in configured data transmissions to improve resource efficiency. In some examples, the configured data transmissions may include downlink transmissions (e.g., PDSCH transmissions) from the base station to the UE at the transmission occasions 405 according to an SPS configuration. Additionally or alternatively, the configured data transmissions may include uplink transmissions (e.g., PUSCH transmissions) from the UE to the base station at the transmission occasions 405 according to a CG configuration. The configuration for the transmission occasions 405 may specify a periodicity 410 and an offset according to an SPS configuration or a CG configuration.

In the example illustrated in FIG. 4, the UE may be configured to communicate with the base station in resources associated with configured repetitions 415 at the transmission occasions 405. For example, the UE may communicate with the base station in repetitions 415-*a* through 415-*d* at a transmission occasion 405-*a*.

The base station may determine to cancel a configured repetition 415-*f* at a transmission occasion 405-*b*. For example, the base station may determine that a communication with another UE has a higher priority than a communication in the configured repetition 415-*f*. Additionally or alternatively, the UE may transmit a request to the base station that the configured repetition 415-f be canceled and the associated communication rescheduled.

The base station may transmit a dynamic grant 425 that indicates a cancellation of the configured repetition 415-f at the transmission occasion 405-b and schedules a dynamic data transmission 430 at a dynamic transmission occasion 435. As illustrated in FIG. 4, the dynamic transmission occasion 435 may be within a periodicity 410-b following the transmission occasion 405-b. Based on the grant, the UE may refrain from communicating with the base station in resources associated with the canceled repetition 415-f. In some examples, the base station may perform a higher priority communication with another UE in the resources associated with the canceled repetition 415-f at the transmission occasion 405-b.

Figure 5:
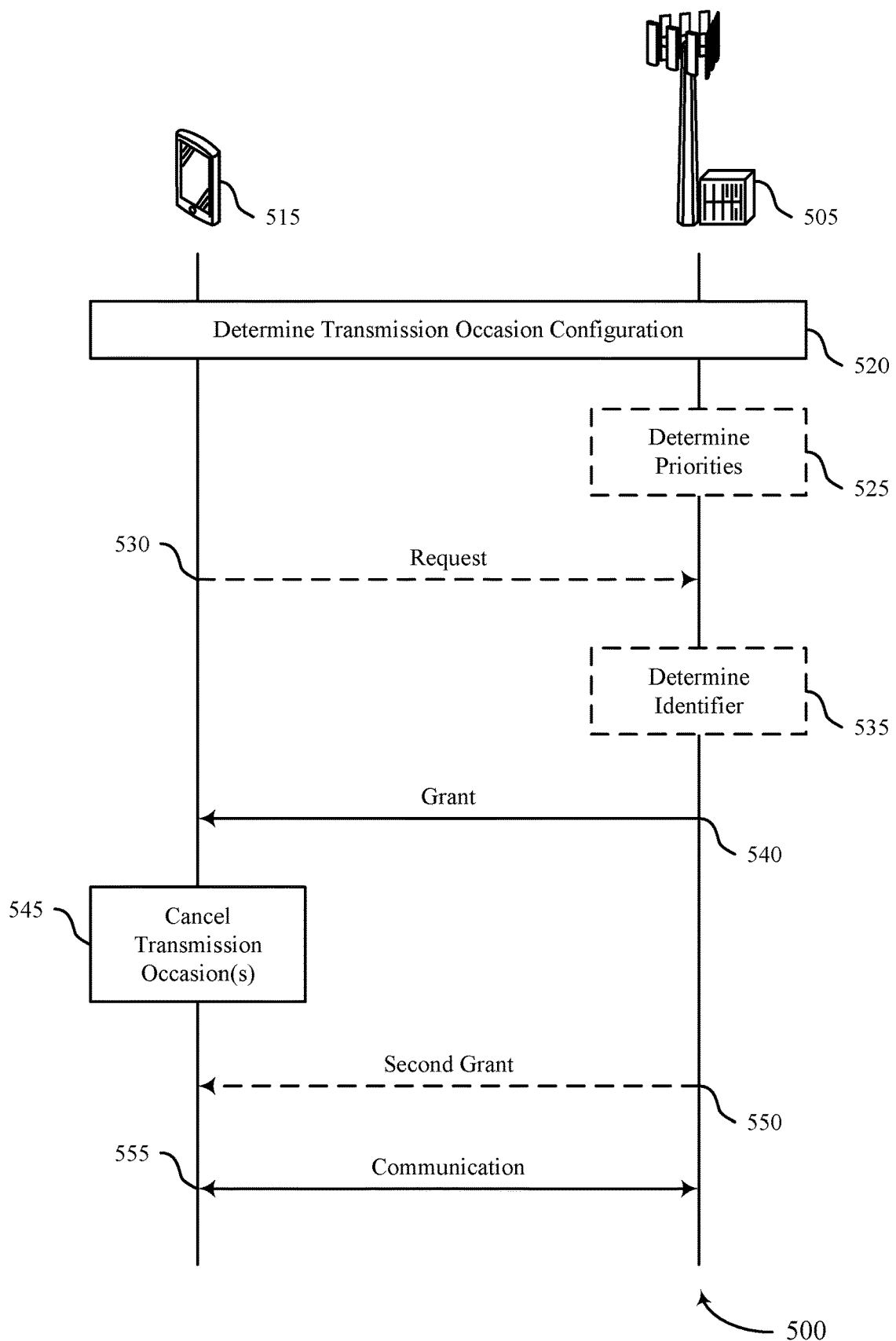
FIG. 5 illustrates an example of a process flow in accordance with aspects of the present disclosure.

FIG. 5 illustrates an example of a process flow 500 in accordance with aspects of the present disclosure. In some examples, the process flow 500 may implement aspects of wireless communications systems 100 and 200. For example, the process flow 500 may include example operations associated with one or more of a base station 505 or a UE 515, which may be examples of the corresponding devices described with reference to FIGS. 1 and 2. In the following description of the process flow 500, the operations between the base station 505 and the UE 515 may be performed in a different order than the example order shown, or the operations performed by the base station 505 and the UE 515 may be performed in different orders or at different times. Some operations may also be omitted from the process flow 500, and other operations may be added to the process flow 500. The operations performed by the base station 505 and the UE 515 may support improvement to the base station 505 transmission occasion configuration operations and, in some examples, may promote improvements to efficiency and reliability for communications between the base station 505 and the UE 515, among other benefits.

At 520, the base station 505 and the UE 515 may determine a configuration for a set of transmission occasions. In some examples, the base station 505 may configure the set of transmission occasions for communicating data with the UE 515 to improve resource efficiency. In some examples, the configuration may specify resources for downlink transmissions (e.g., PDSCH transmissions) from the base station 505 to the UE 515 according to an SPS configuration. Additionally or alternatively, the configuration may specify resources for uplink transmissions (e.g., PUSCH transmissions) from the UE 515 to the base station 505 according to a CG configuration. The configuration may include a periodicity and an offset according to the SPS configuration or the CG configuration. In some examples, the UE 515 may be configured to communicate with the base station 505 in resources associated with a set of repetitions at each transmission occasion.

In some examples, at 525 the base station 505 may determine priorities associated with one or more communications with one or more UEs, including the UE 515. For example, the base station 505 may determine a first priority associated with a communication at a transmission occasion of the set of transmission occasions and a second priority associated with a communication with another UE (not shown). The base station 505 may determine the second priority is greater than the first priority.

In some examples, at 530 the UE 515 may transmit a request to the base station 505 that the transmission occasion of the set of transmission occasions be canceled and rescheduled. For example, the UE 515 may determine that the UE 515 has no data to transmit at the transmission occasion (which may be a CG transmission occasion), and may request that the transmission occasion be canceled to improve resource efficiency at the UE 515.

In some examples, at 535 the base station 505 may determine an identifier (e.g., a HARQ process identifier) for the canceled transmission occasion. The identifier may be based on the periodicity configured for the set of transmission occasions.

At 540, the base station 505 may transmit a grant (e.g., a dynamic grant) to the UE 515. The grant may indicate a cancellation of the transmission occasion and schedule a dynamic transmission occasion for communicating information (e.g., data) scheduled for transmission at the canceled transmission occasion. In some examples, the base station 505 may indicate the cancellation in a DCI message in the grant. In some examples, the base station 505 may transmit the grant based on determining the second priority is higher than the first priority associated with the canceled transmission occasion. In some examples, the base station 505 may transmit the grant based on receiving the request from the UE 515. In some examples, the grant may indicate one or more repetitions of the set of repetitions at the transmission occasion are to be canceled and rescheduled.

In some examples, the cancellation may be explicit, where the grant may one or more bits indicating the canceled transmission occasion. Additionally or alternatively, the cancellation may be implicit. For example, the grant may indicate the identifier associated with the canceled transmission occasion when scheduling the dynamic transmission occasion. Based on the indicated identifier, the UE 515 may determine that the configured transmission occasion with the indicated identifier is to be canceled and the information scheduled for transmission at the canceled transmission occasion is rescheduled for transmission at the dynamic transmission occasion.

In some examples, the base station 505 may indicate multiple cancellations of a set of configured transmission occasions. For example, the base station 505 may indicate cancellations of a quantity of consecutive transmission occasions and reschedule associated data transmissions at dynamic transmission occasions. Additionally or alternatively, the base station 505 may indicate cancellations of a quantity of non-consecutive transmission occasions, for example based on a pattern indicated in the grant. In some examples, the base station 505 may indicate in the grant that the UE 515 is to cancel communications in resources associated with the configured set transmission occasions until a second grant is received that indicates the communications are to resume.

At 545, the UE 515 may cancel a communication at the transmission occasion based on the grant. For example, the UE 515 may refrain from attempting to decode a PDSCH transmission or refrain from transmitting a PUSCH transmission in resources associated with the canceled transmission occasion. In some examples, the UE may cancel communications at the one or more transmission occasions or repetitions indicated in the grant.

In some examples, at 550 the base station 505 may transmit the second grant indicating that communications are to resume according to the configuration for the set of transmission occasions.

At 555, the UE 515 may communicate with the base station 505 according to the received grant. The UE 515 may communicate with the base station 505 at the dynamic transmission occasion, which may include communicating the information (e.g., data) scheduled for transmission at the canceled transmission occasion. The operations performed by the base station 505 and the UE 515 may support improvement to the transmission occasion configuration operations and, in some examples, may promote improvements to efficiency and reliability for communications between the base station 505 and the UE 515, among other benefits.

Figure 6:
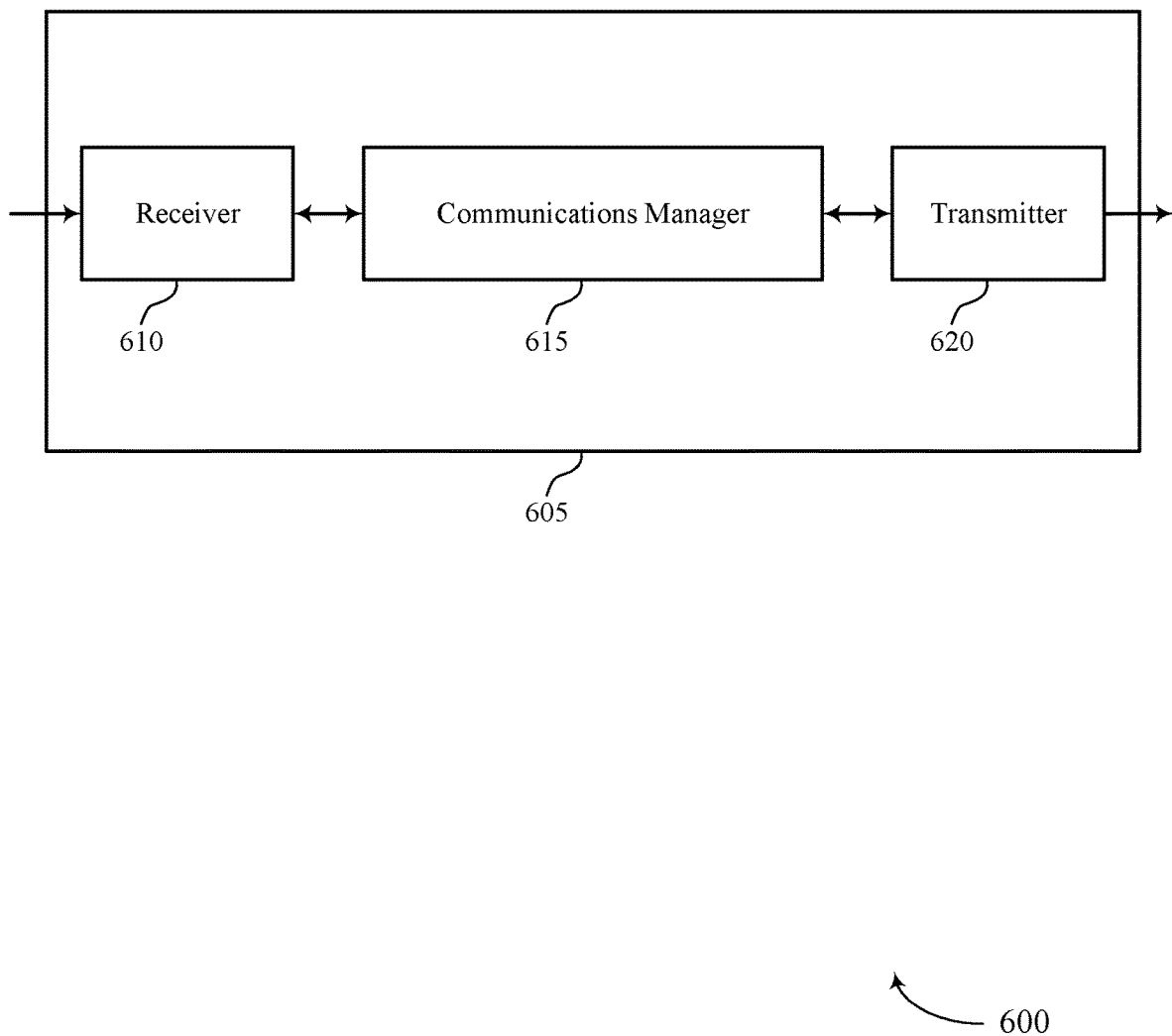
FIGS. 6 and 7 show block diagrams of devices in accordance with aspects of the present disclosure.

FIG. 6 shows a block diagram 600 of a device 605 in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, or information related to cancellation of transmission occasions). Information may be passed on to other components of the device 605. The receiver 610 may be an example of aspects of the transceiver 920 described with reference to FIG. 9. The receiver 610 may utilize a single antenna or a set of antennas.

The communications manager 615 may determine a configuration for a set of transmission occasions for communications with a base station, the configuration including a periodicity and an offset associated with each transmission occasion of the set of transmission occasions, receive, from the base station, a grant that indicates a cancellation of a transmission occasion of the set of transmission occasions and schedules a dynamic transmission occasion to reschedule a transmission of information associated with the canceled transmission occasion, and communicate the information with the base station at the dynamic transmission occasion based on receiving the grant.

The communications manager 615 as described herein may be implemented to realize one or more potential advantages. One implementation may allow the device 605 to save power and increase battery life by communicating with a base station 105 (as shown in FIG. 1) more efficiently. For example, the device 605 may efficiently communicate with the base station 105 based on cancelling and rescheduling transmission occasions according to the dynamic grant. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
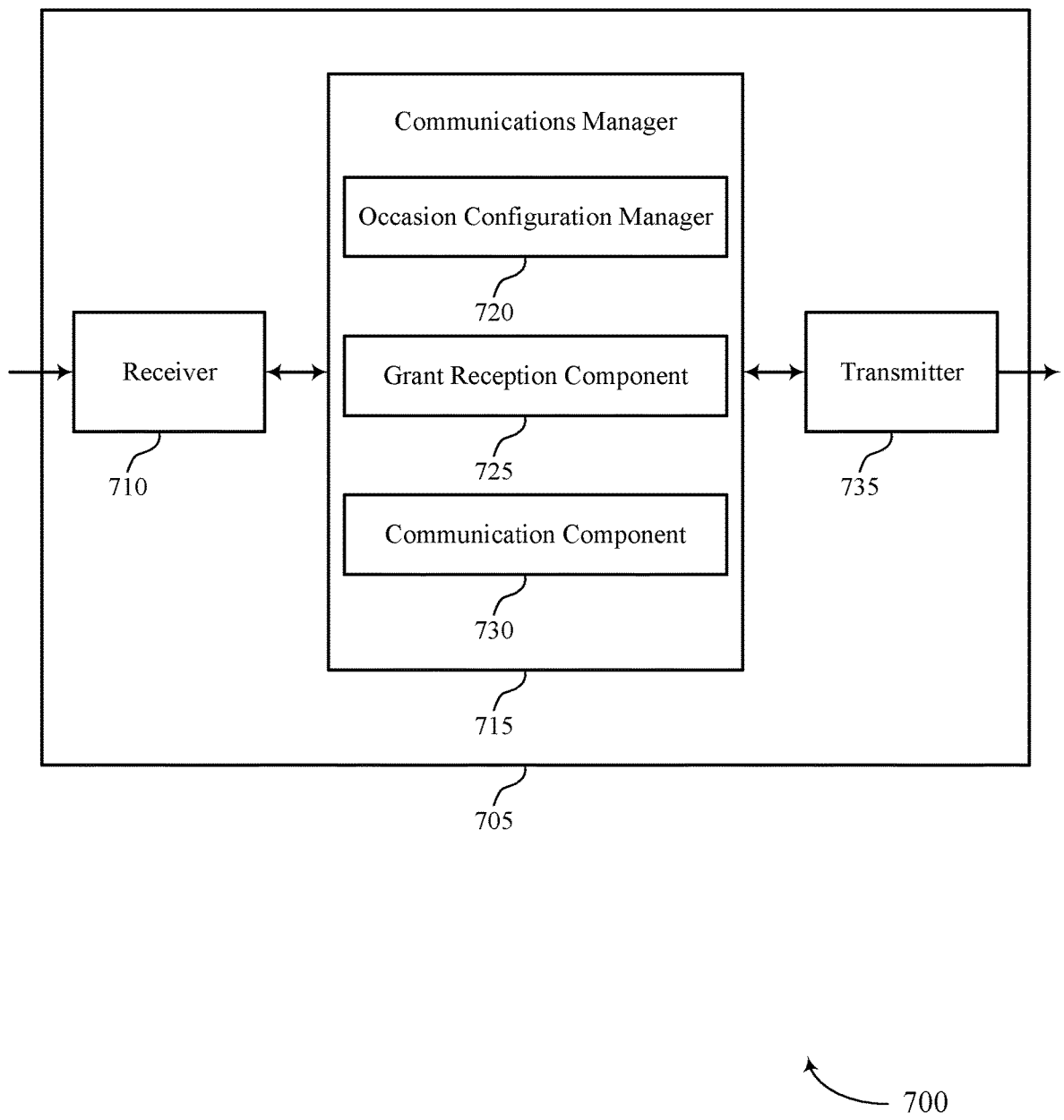

FIG. 7 shows a block diagram 700 of a device 705 in accordance with aspects of the present disclosure. The device 705 may be an example of aspects of a device 605, or a UE 115 as described herein. The device 705 may include a receiver 710, a communications manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, or information related to cancellation of transmission occasions). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include an occasion configuration manager 720, a grant reception component 725, and a communication component 730. The communications manager 715 may be an example of aspects of the communications manager 910 described herein.

The occasion configuration manager 720 may determine a configuration for a set of transmission occasions for communications with a base station, the configuration including a periodicity and an offset associated with each transmission occasion of the set of transmission occasions.

The grant reception component 725 may receive, from the base station, a grant that indicates a cancellation of a transmission occasion of the set of transmission occasions and schedules a dynamic transmission occasion to reschedule a transmission of information associated with the canceled transmission occasion.

The communication component 730 may communicate the information with the base station at the dynamic transmission occasion based on receiving the grant.

The transmitter 735 may transmit signals generated by other components of the device 705. In some examples, the transmitter 735 may be collocated with a receiver 710 in a transceiver module. For example, the transmitter 735 may be an example of aspects of the transceiver 920 described with reference to FIG. 9. The transmitter 735 may utilize a single antenna or a set of antennas.

Figure 8:
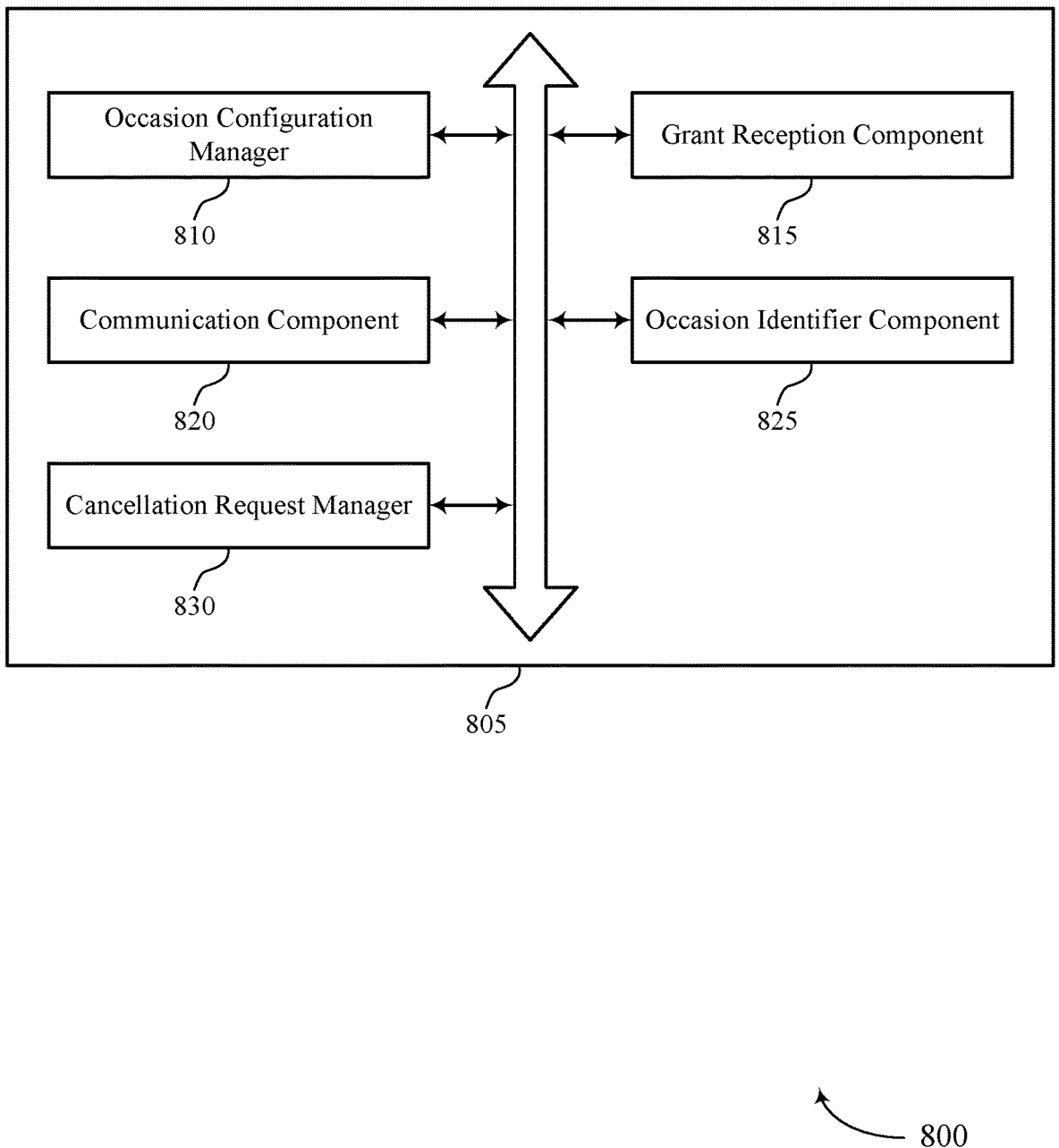
FIG. 8 shows a block diagram of a communications manager in accordance with aspects of the present disclosure.

FIG. 8 shows a block diagram 800 of a communications manager 805 in accordance with aspects of the present disclosure. The communications manager 805 may be an example of aspects of a communications manager 615, a communications manager 715, or a communications manager 910 described herein. The communications manager 805 may include an occasion configuration manager 810, a grant reception component 815, a communication component 820, an occasion identifier component 825, and a cancellation request manager 830. Each of these modules may communicate, directly or indirectly, with one another (e.g., via one or more buses).

The occasion configuration manager 810 may determine a configuration for a set of transmission occasions for communications with a base station, the configuration including a periodicity and an offset associated with each transmission occasion of the set of transmission occasions. In some examples, the occasion configuration manager 810 may determine a scheduling associated with SPS occasions for downlink transmissions to the UE, where the set of transmission occasions include a set of SPS occasions for downlink transmissions. In some examples, the occasion configuration manager 810 may determine a scheduling associated with CG occasions for uplink transmissions from the UE, where the set of transmission occasions include a set of CG occasions for uplink transmissions. In some examples, the occasion configuration manager 810 may determine a set of repetitions associated with the canceled transmission occasion, where the indicated cancellation identifies one or more repetitions of the set of repetitions.

The grant reception component 815 may receive, from the base station, a grant that indicates a cancellation of a transmission occasion of the set of transmission occasions and schedules a dynamic transmission occasion to reschedule a transmission of information associated with the canceled transmission occasion. In some examples, the grant reception component 815 may identify, in the received grant, an indication of a set of canceled transmission occasions, where the set of canceled transmission occasions include the canceled transmission occasion. In some examples, the grant reception component 815 may receive a second grant that indicates the UE is to resume communicating with the base station in resources associated with the configuration, where communicating with the base station at the dynamic transmission occasion is based on receiving the second grant. In some examples, the grant reception component 815 may identify, in the received grant, DCI that indicates the cancellation and schedules the dynamic transmission occasion, where communicating at the dynamic transmission occasion is based on identifying the DCI.

In some cases, the received grant includes one or more bits identifying the canceled transmission occasion. In some cases, the set of canceled transmission occasions are consecutive in the set of transmission occasions or non-consecutive in the set of transmission occasions. In some cases, the set of canceled transmission occasions are based on a set of cancellations in the indication, the set of cancellations based on a pattern associated with the set of transmission occasions. In some cases, the grant that indicates the cancellation of the transmission occasion of the set of transmission occasions and schedules the dynamic transmission occasion to transmit information associated with the canceled transmission occasion for a set of UEs, the set of UEs including the UE.

The communication component 820 may communicate the information with the base station at the dynamic transmission occasion based on receiving the grant. In some examples, the communication component 820 may refrain from communicating the information with the base station in resources associated with the configuration at the canceled transmission occasion based on receiving the grant, where communicating the information with the base station at the dynamic transmission occasion is based on refraining from communicating the information. In some examples, the communication component 820 may refrain from communicating with the base station in resources associated with the configuration at the set of canceled transmission occasions based on receiving the grant. In some examples, the communication component 820 may refrain from communicating with the base station at the one or more repetitions based on receiving the grant.

The occasion identifier component 825 may determine an identifier associated with the canceled transmission occasion based on receiving the grant. In some examples, the occasion identifier component 825 may determine that the identifier is associated with the dynamic transmission occasion based on determining the identifier, where refraining from communicating with the base station at the canceled transmission occasion is based on determining that the identifier is associated with the dynamic transmission occasion. In some cases, the identifier includes a HARQ process identifier.

The cancellation request manager 830 may transmit a message to the base station requesting to cancel the transmission occasion, where receiving the grant is based on transmitting the message.

Figure 9:
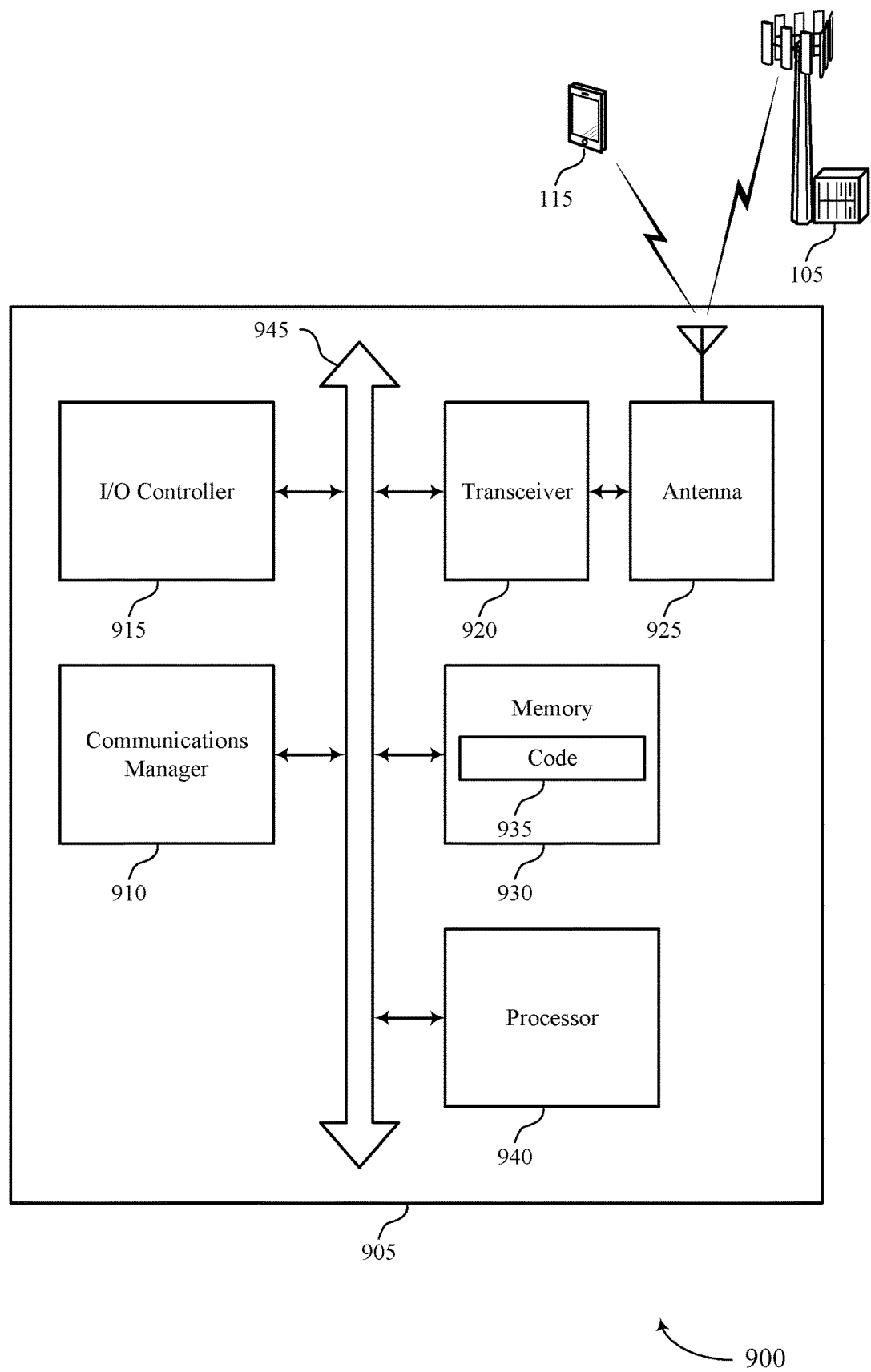
FIG. 9 shows a diagram of a system including a device in accordance with aspects of the present disclosure.

FIG. 9 shows a diagram of a system 900 including a device 905 in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may determine a configuration for a set of transmission occasions for communications with a base station, the configuration including a periodicity and an offset associated with each transmission occasion of the set of transmission occasions, receive, from the base station, a grant that indicates a cancellation of a transmission occasion of the set of transmission occasions and schedules a dynamic transmission occasion to reschedule a transmission of information associated with the canceled transmission occasion, and communicate the information with the base station at the dynamic transmission occasion based on receiving the grant.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some cases, the memory 930 may contain, among other things, a basic input/output system (BIOS) which may control basic hardware or software operation such as the interaction with peripheral components or devices.

The processor 940 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting cancellation of transmission occasions).

The processor 940 of the device 905 (e.g., controlling the receiver 610, the transmitter 620, or the transceiver 920) may reduce power consumption and increase communications efficiency based on the grant indicating the cancellation and scheduling the dynamic transmission occasion. In some examples, the processor 940 of the device 905 may reconfigure parameters for communicating according to the transmission occasion configuration. For example, the processor 940 of the device 905 may turn on one or more processing units for receiving or transmitting data, increase a processing clock, or a similar mechanism within the device 905. As such, when subsequent dynamic grants are received, the processor 940 may be ready to respond more efficiently through the reduction of a ramp up in processing power.

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
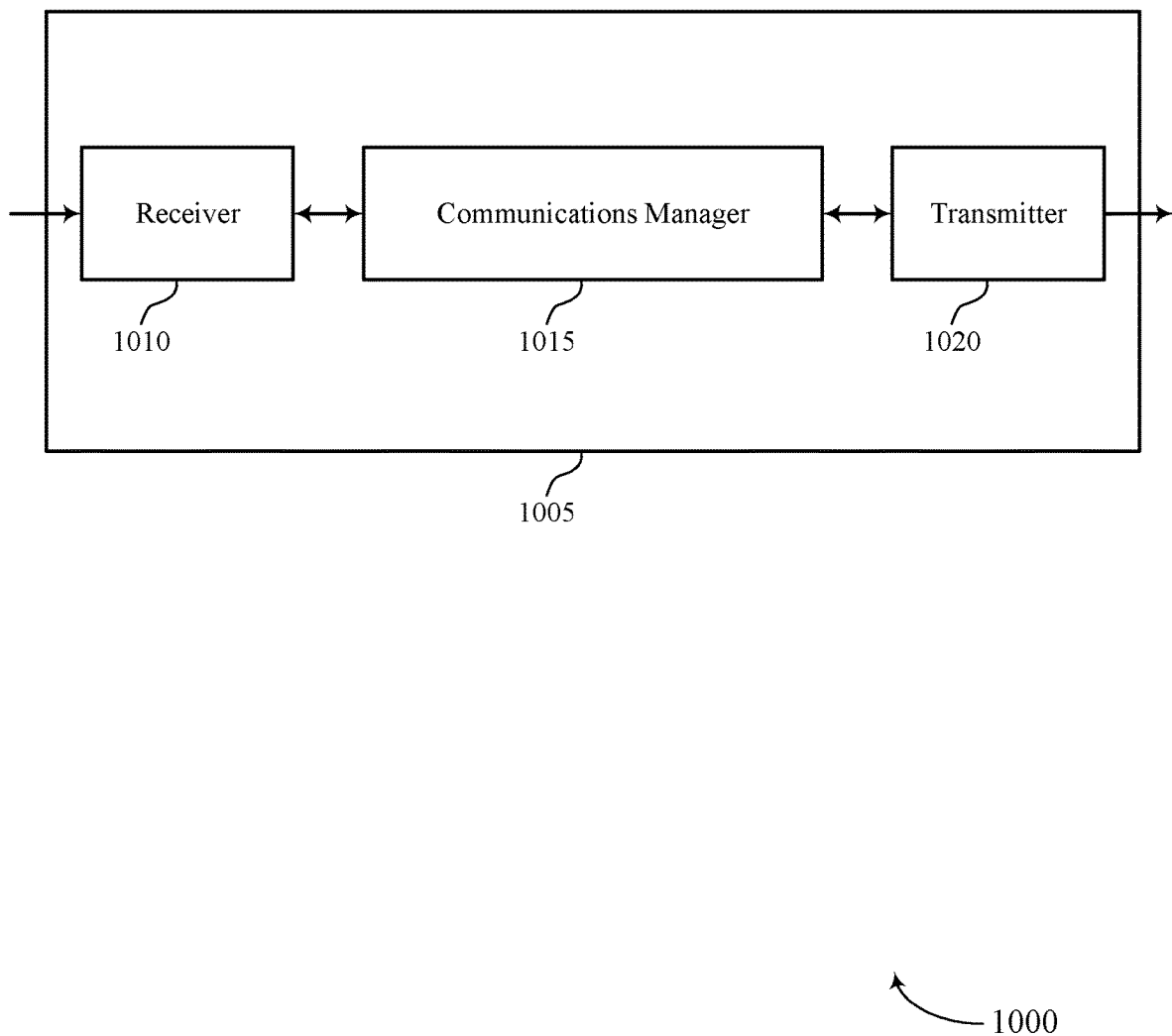
FIGS. 10 and 11 show block diagrams of devices in accordance with aspects of the present disclosure.

FIG. 10 shows a block diagram 1000 of a device 1005 in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, or information related to cancellation of transmission occasions). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may determine a configuration for a set of transmission occasions for communications with a UE, the configuration including a periodicity and an offset associated with each transmission occasion of the set of transmission occasions, transmit, to the UE, a grant that indicates a cancellation of a transmission occasion of the set of transmission occasions and schedules a dynamic transmission occasion to reschedule a transmission of information associated with the canceled transmission occasion, and communicate the information with the UE at the dynamic transmission occasion based on transmitting the grant.

The communications manager 1015 as described herein may be implemented to realize one or more potential advantages. One implementation may allow the device 1005 to save power by communicating with a UE 115 (as shown in FIG. 1) more efficiently. For example, the device 1005 may improve reliability in communications with a UE 115, as the device 1005 may be able to determine and indicate a cancellation of a configured transmission occasion and schedule a dynamic transmission occasion. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
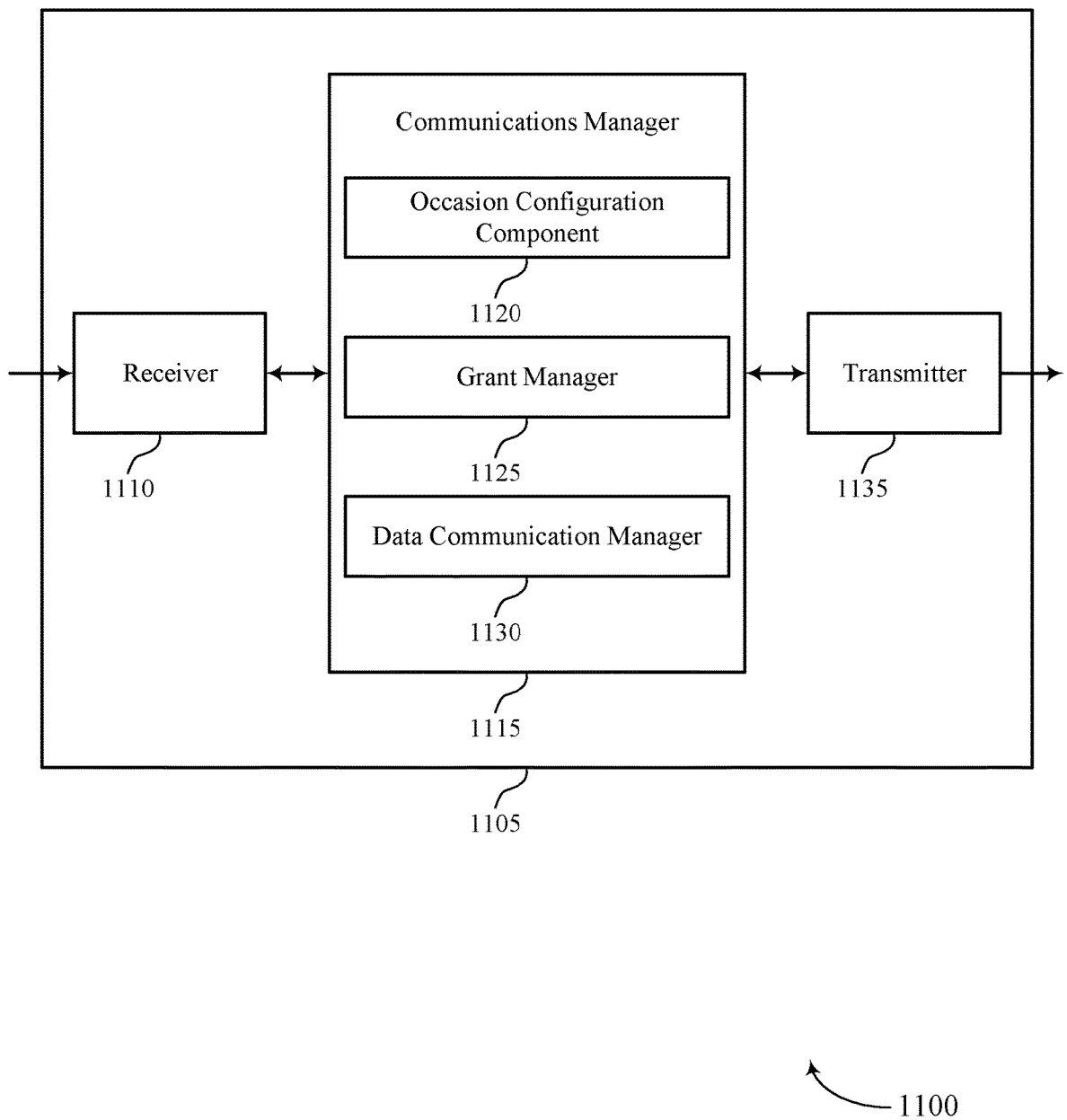

FIG. 11 shows a block diagram 1100 of a device 1105 in accordance with aspects of the present disclosure. The device 1105 may be an example of aspects of a device 1005, or a base station 105 as described herein. The device 1105 may include a receiver 1110, a communications manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, or information related to cancellation of transmission occasions). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include an occasion configuration component 1120, a grant manager 1125, and a data communication manager 1130. The communications manager 1115 may be an example of aspects of the communications manager 1310 described herein.

The occasion configuration component 1120 may determine a configuration for a set of transmission occasions for communications with a UE, the configuration including a periodicity and an offset associated with each transmission occasion of the set of transmission occasions.

The grant manager 1125 may transmit, to the UE, a grant that indicates a cancellation of a transmission occasion of the set of transmission occasions and schedules a dynamic transmission occasion to reschedule a transmission of information associated with the canceled transmission occasion.

The data communication manager 1130 may communicate the information with the UE at the dynamic transmission occasion based on transmitting the grant.

The transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1320 described with reference to FIG. 13. The transmitter 1135 may utilize a single antenna or a set of antennas.

Figure 12:
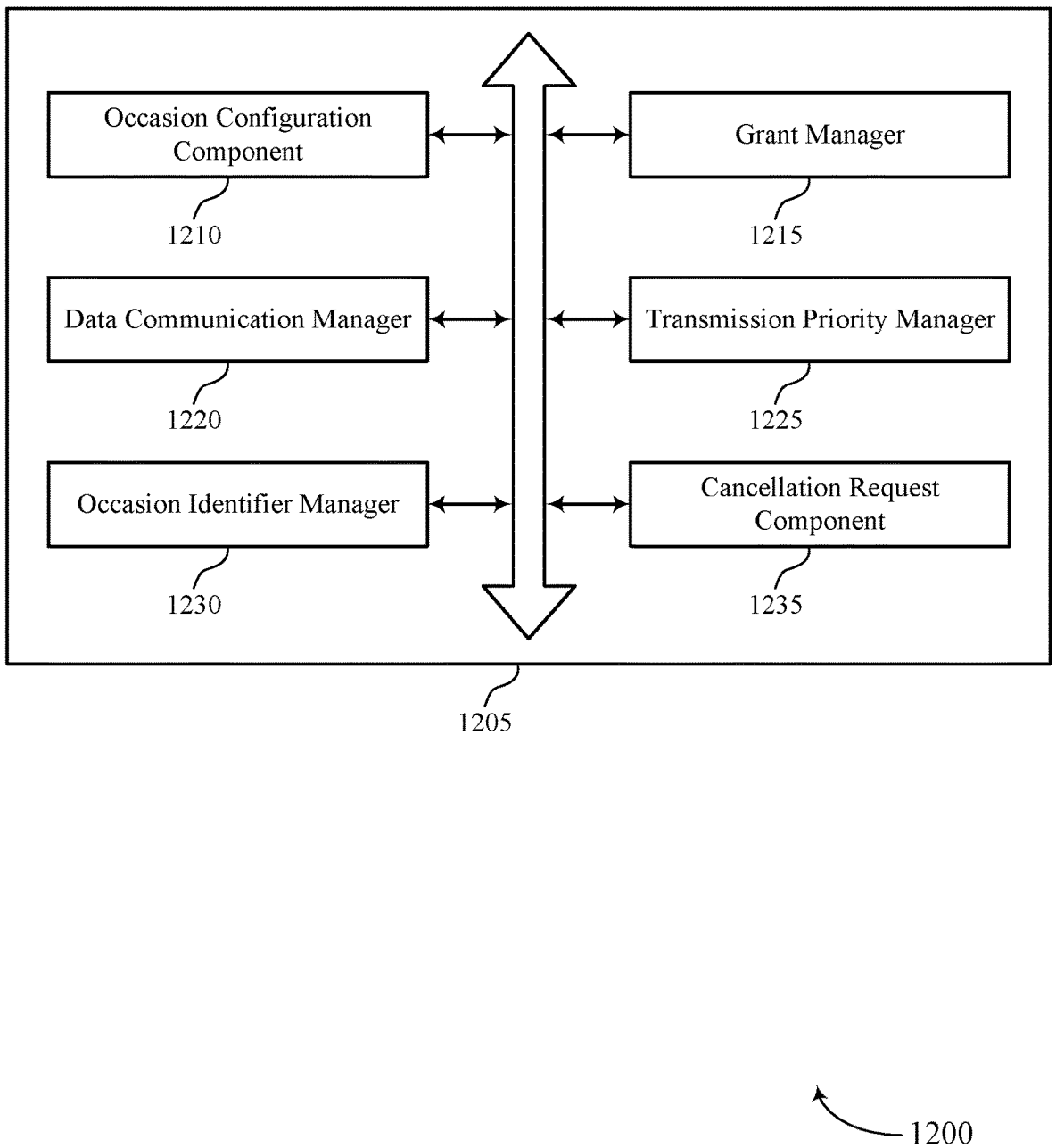
FIG. 12 shows a block diagram of a communications manager in accordance with aspects of the present disclosure.

FIG. 12 shows a block diagram 1200 of a communications manager 1205 in accordance with aspects of the present disclosure. The communications manager 1205 may be an example of aspects of a communications manager 1015, a communications manager 1115, or a communications manager 1310 described herein. The communications manager 1205 may include an occasion configuration component 1210, a grant manager 1215, a data communication manager 1220, a transmission priority manager 1225, an occasion identifier manager 1230, and a cancellation request component 1235. Each of these modules may communicate, directly or indirectly, with one another (e.g., via one or more buses).

The occasion configuration component 1210 may determine a configuration for a set of transmission occasions for communications with a UE, the configuration including a periodicity and an offset associated with each transmission occasion of the set of transmission occasions. In some examples, the occasion configuration component 1210 may determine a scheduling associated with SPS occasions for downlink transmissions to the UE, where the set of transmission occasions include a set of SPS occasions for downlink transmissions. In some examples, the occasion configuration component 1210 may determine a scheduling associated with CG occasions for uplink transmissions from the UE, where the set of transmission occasions include a set of CG occasions for uplink transmissions. In some examples, the occasion configuration component 1210 may determine a set of repetitions associated with the canceled transmission occasion, where the indicated cancellation identifies one or more repetitions of the set of repetitions.

The grant manager 1215 may transmit, to the UE, a grant that indicates a cancellation of a transmission occasion of the set of transmission occasions and schedules a dynamic transmission occasion to reschedule a transmission of information associated with the canceled transmission occasion. In some examples, the grant manager 1215 may transmit, in the transmitted grant an indication of a set of canceled transmission occasions, where the set of canceled transmission occasions include the canceled transmission occasion. In some examples, the grant manager 1215 may transmit a second grant that indicates the UE is to resume communicating with the base station in resources associated with the configuration, where communicating with the UE at the dynamic transmission occasion is based on transmitting the second grant. In some examples, the grant manager 1215 may transmit, in the transmitted grant, DCI that indicates the cancellation and schedules the dynamic transmission occasion, where communicating at the dynamic transmission occasion is based on transmitting the DCI. In some examples, the grant manager 1215 may transmit the grant to one or more additional UEs.

In some cases, the transmitted grant includes one or more bits identifying the canceled transmission occasion. In some cases, the set of canceled transmission occasions are consecutive in the set of transmission occasions or non-consecutive in the set of transmission occasions. In some cases, the set of canceled transmission occasions are based on a set of cancellations in the indication, the set of cancellations based on a pattern associated with the set of transmission occasions. In some cases, the transmitted grant indicates one or more second cancellations of one or more second transmission occasions of the set of transmission occasions.

The data communication manager 1220 may communicate the information with the UE at the dynamic transmission occasion based on transmitting the grant. In some examples, the data communication manager 1220 may refrain from communicating the information with the UE in resources associated with the configuration at the canceled transmission occasion based on receiving the grant, where communicating the information with the base station at the dynamic transmission occasion is based on refraining from communicating the information. In some examples, the data communication manager 1220 may refrain from communicating with the UE in resources associated with the configuration at the set of canceled transmission occasions based on transmitting the indication in the transmitted grant.

In some examples, the data communication manager 1220 may refrain from communicating with the one or more additional UEs at the canceled transmission occasion based on transmitting the grant. In some examples, the data communication manager 1220 may communicate with the one or more additional UEs at the dynamic transmission occasion based on transmitting the grant. In some examples, the data communication manager 1220 may refrain from communicating with the UE at the one or more repetitions based on transmitting the grant.

The transmission priority manager 1225 may determine a first priority associated with the canceled transmission occasion and a second priority associated with a communication with a second UE, where the second priority is greater than the first priority, where transmitting the grant is based on determining the first priority and the second priority.

The occasion identifier manager 1230 may determine an identifier associated with the canceled transmission occasion based on transmitting the grant. In some examples, the occasion identifier manager 1230 may transmit an indication in the transmitted grant that the identifier is associated with the dynamic transmission occasion, where refraining from communicating with the UE at the canceled transmission occasion is based on the indication that the identifier is associated with the dynamic transmission occasion. In some cases, the identifier includes a HARQ process identifier.

The cancellation request component 1235 may receive a message from the UE requesting to cancel the transmission occasion, where transmitting the grant is based on receiving the message.

Figure 13:
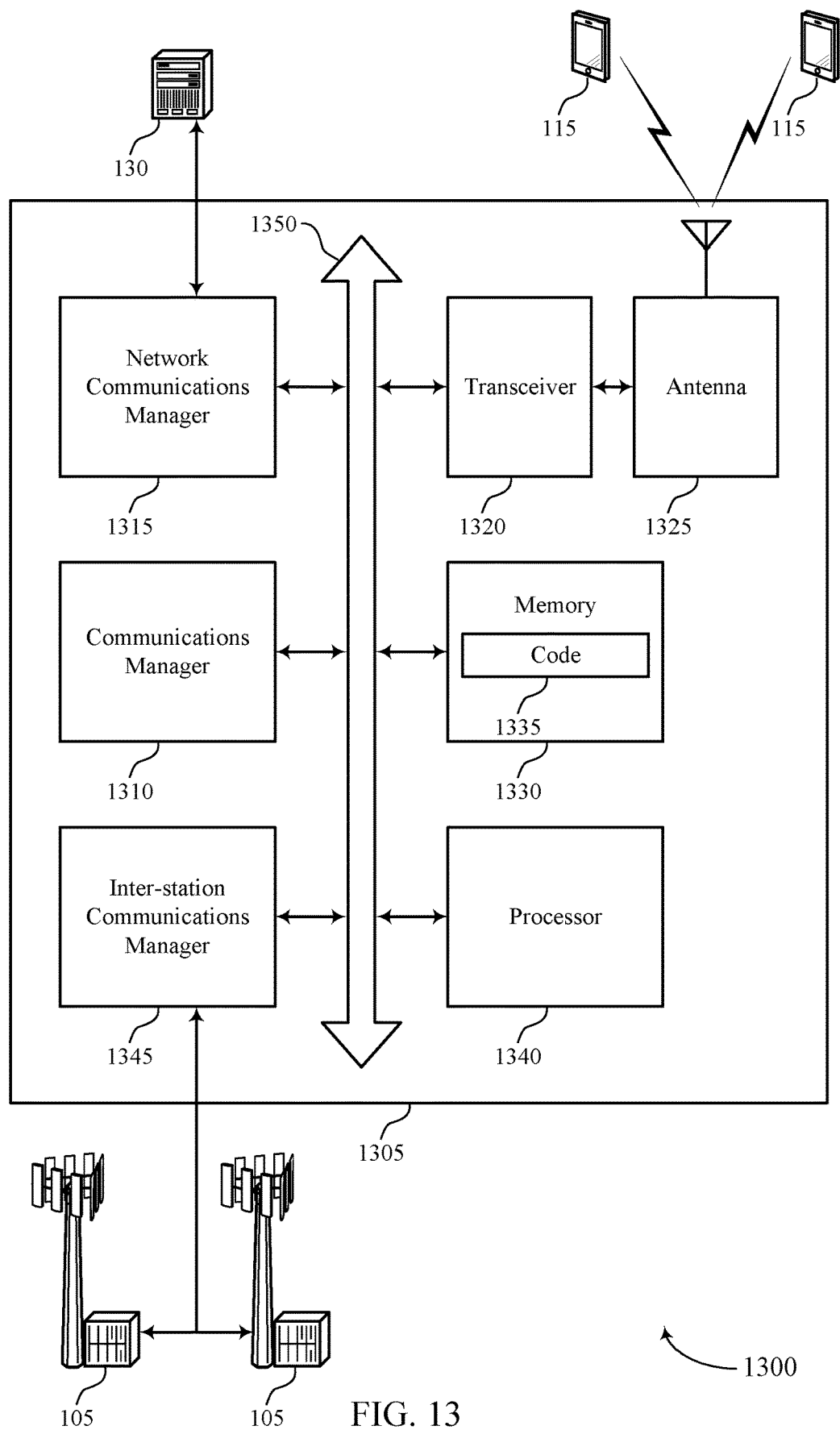
FIG. 13 shows a diagram of a system including a device in accordance with aspects of the present disclosure.

FIG. 13 shows a diagram of a system 1300 including a device 1305 in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may determine a configuration for a set of transmission occasions for communications with a UE, the configuration including a periodicity and an offset associated with each transmission occasion of the set of transmission occasions, transmit, to the UE, a grant that indicates a cancellation of a transmission occasion of the set of transmission occasions and schedules a dynamic transmission occasion to reschedule a transmission of information associated with the canceled transmission occasion, and communicate the information with the UE at the dynamic transmission occasion based on transmitting the grant.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting cancellation of transmission occasions).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
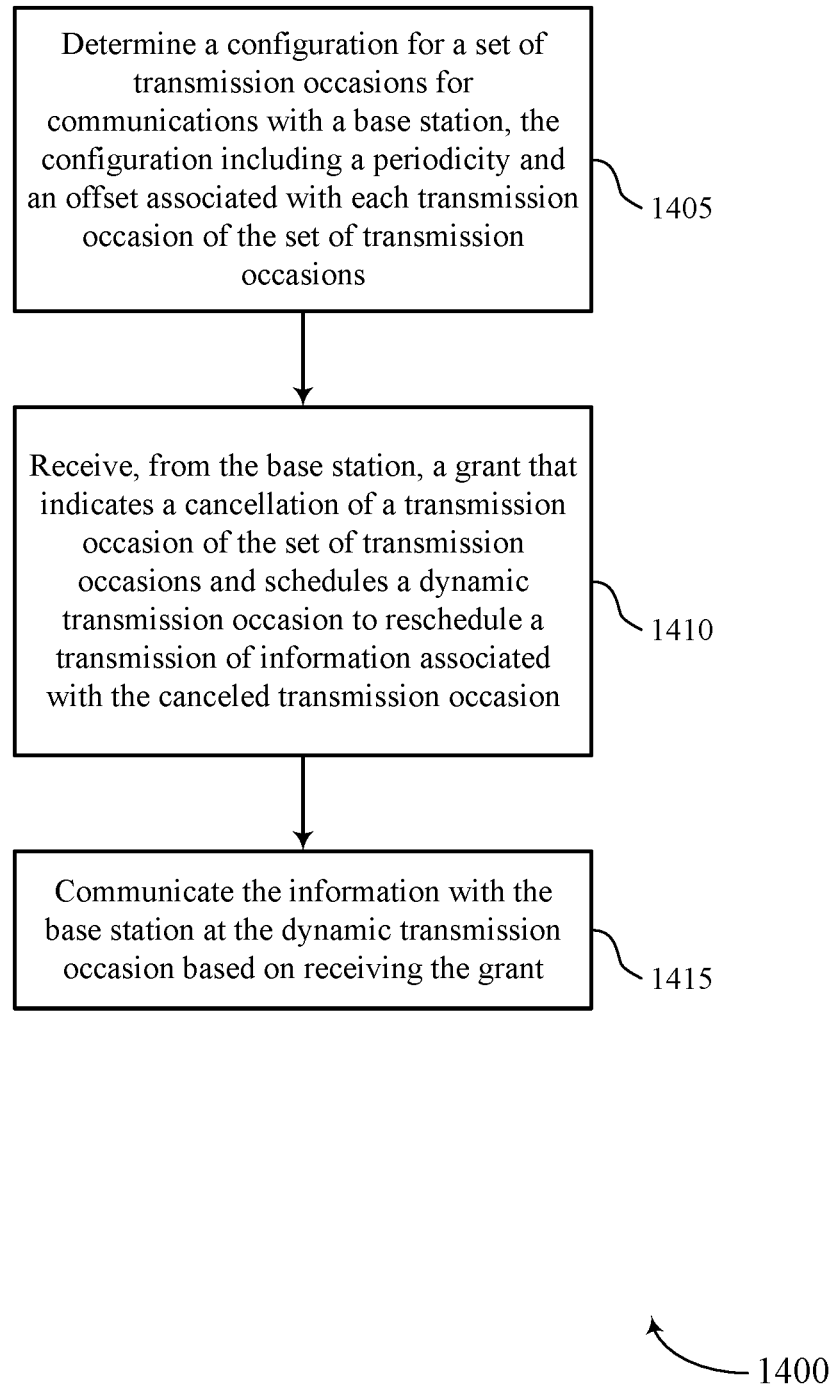
FIGS. 14 through 19 show flowcharts illustrating methods in accordance with aspects of the present disclosure.

FIG. 14 shows a flowchart illustrating a method 1400 in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may determine a configuration for a set of transmission occasions for communications with a base station, the configuration including a periodicity and an offset associated with each transmission occasion of the set of transmission occasions. The operations of 1405 may be performed according to the methods described herein. In some examples, aspects of the operations of 1405 may be performed by an occasion configuration manager as described with reference to FIGS. 6 through 9.

At 1410, the UE may receive, from the base station, a grant that indicates a cancellation of a transmission occasion of the set of transmission occasions and schedules a dynamic transmission occasion to reschedule a transmission of information associated with the canceled transmission occasion. The operations of 1410 may be performed according to the methods described herein. In some examples, aspects of the operations of 1410 may be performed by a grant reception component as described with reference to FIGS. 6 through 9.

At 1415, the UE may communicate the information with the base station at the dynamic transmission occasion based on receiving the grant. The operations of 1415 may be performed according to the methods described herein. In some examples, aspects of the operations of 1415 may be performed by a communication component as described with reference to FIGS. 6 through 9.

Figure 15:
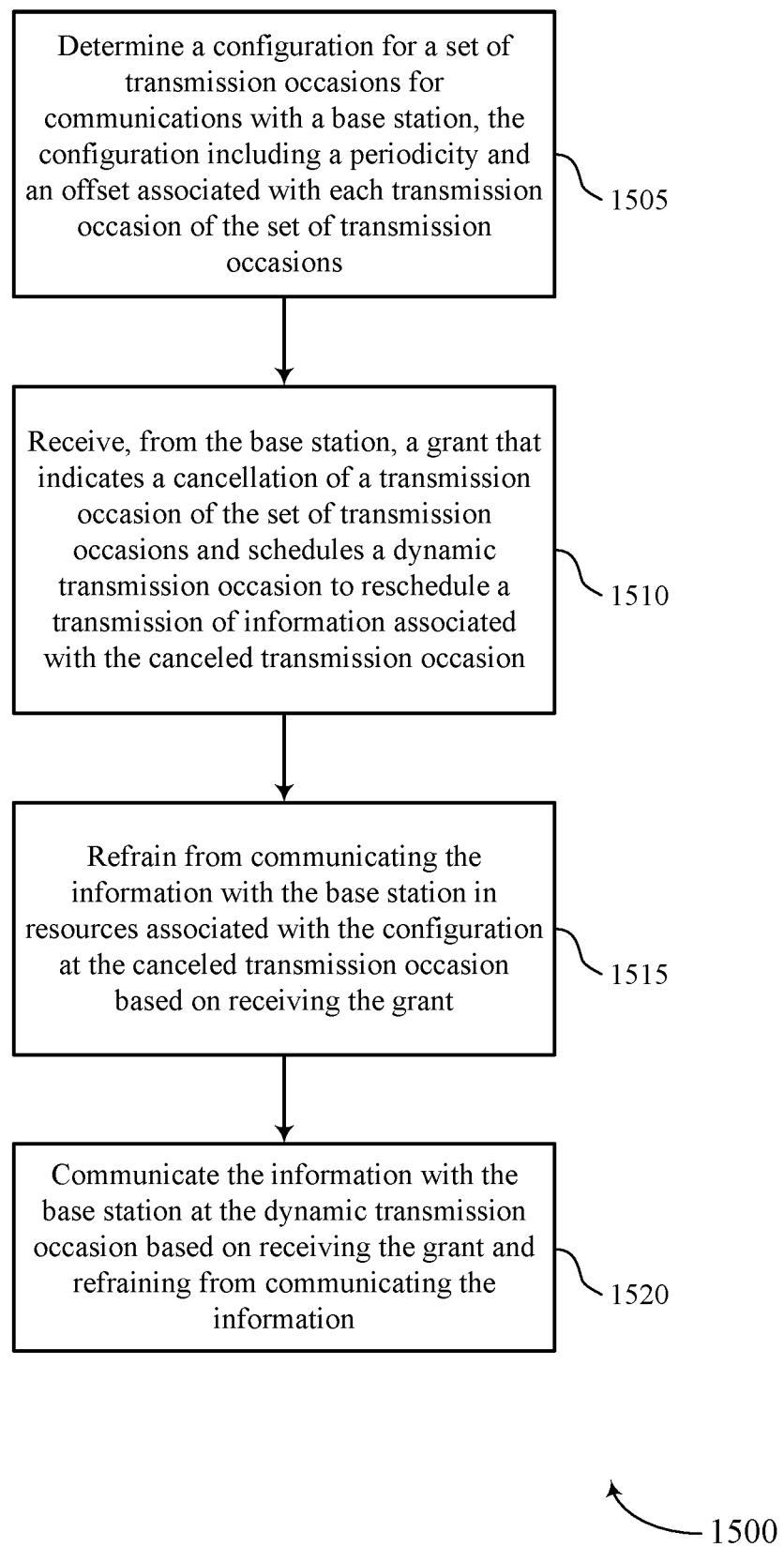

FIG. 15 shows a flowchart illustrating a method 1500 in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may determine a configuration for a set of transmission occasions for communications with a base station, the configuration including a periodicity and an offset associated with each transmission occasion of the set of transmission occasions. The operations of 1505 may be performed according to the methods described herein. In some examples, aspects of the operations of 1505 may be performed by an occasion configuration manager as described with reference to FIGS. 6 through 9.

At 1510, the UE may receive, from the base station, a grant that indicates a cancellation of a transmission occasion of the set of transmission occasions and schedules a dynamic transmission occasion to reschedule a transmission of information associated with the canceled transmission occasion. The operations of 1510 may be performed according to the methods described herein. In some examples, aspects of the operations of 1510 may be performed by a grant reception component as described with reference to FIGS. 6 through 9.

At 1515, the UE may refrain from communicating the information with the base station in resources associated with the configuration at the canceled transmission occasion based on receiving the grant. The operations of 1515 may be performed according to the methods described herein. In some examples, aspects of the operations of 1515 may be performed by a communication component as described with reference to FIGS. 6 through 9.

At 1520, the UE may communicate the information with the base station at the dynamic transmission occasion based on receiving the grant and refraining from communicating the information. The operations of 1520 may be performed according to the methods described herein. In some examples, aspects of the operations of 1520 may be performed by a communication component as described with reference to FIGS. 6 through 9.

Figure 16:
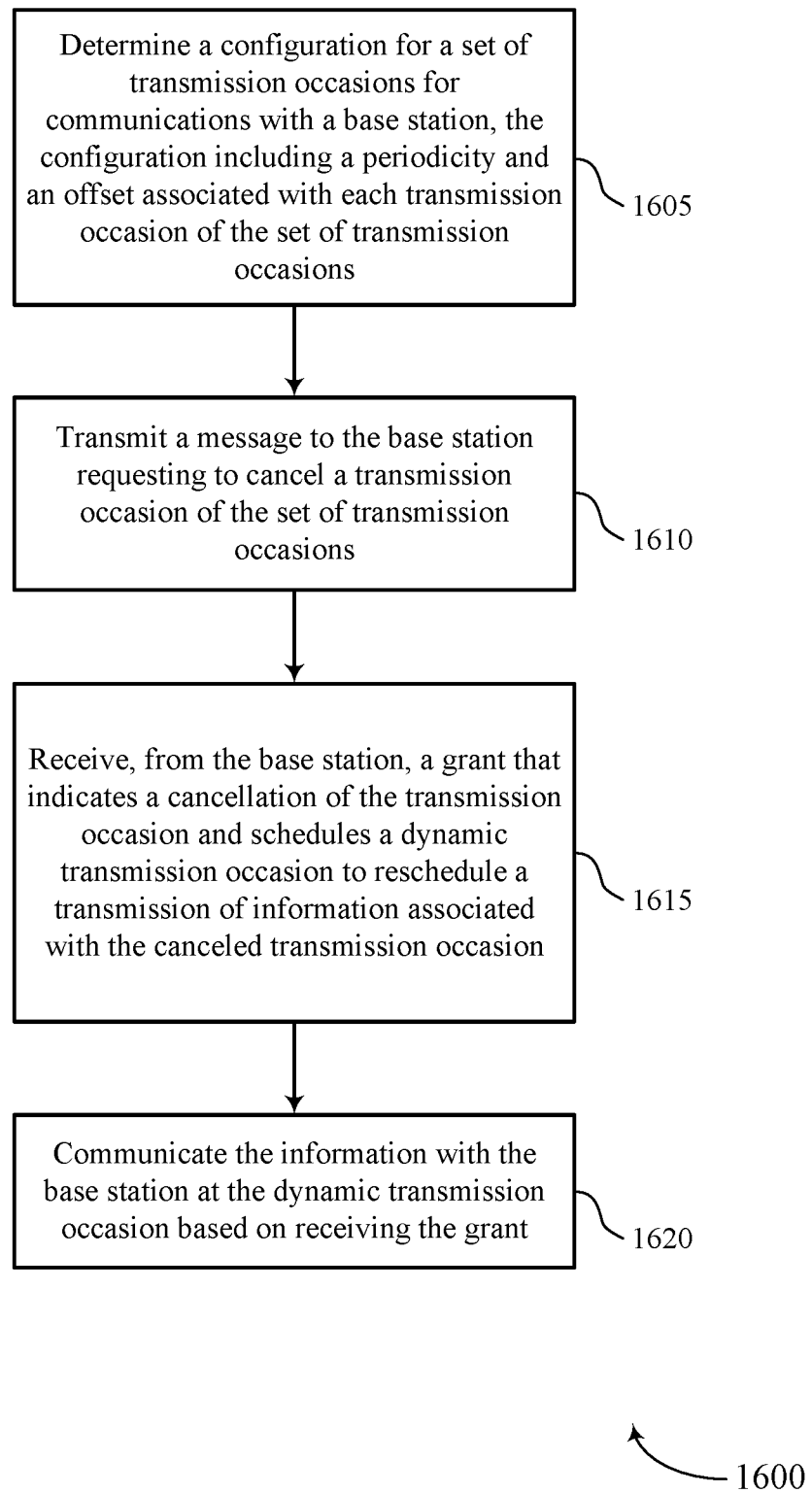

FIG. 16 shows a flowchart illustrating a method 1600 in accordance with aspects of the present disclosure. The operations of method 1600 may be implemented by a UE 115 or its components as described herein. For example, the operations of method 1600 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1605, the UE may determine a configuration for a set of transmission occasions for communications with a base station, the configuration including a periodicity and an offset associated with each transmission occasion of the set of transmission occasions. The operations of 1605 may be performed according to the methods described herein. In some examples, aspects of the operations of 1605 may be performed by an occasion configuration manager as described with reference to FIGS. 6 through 9.

At 1610, the UE may transmit a message to the base station requesting to cancel a transmission occasion of the set of transmission occasions. The operations of 1610 may be performed according to the methods described herein. In some examples, aspects of the operations of 1610 may be performed by a cancellation request manager as described with reference to FIGS. 6 through 9.

At 1615, the UE may receive, from the base station, a grant that indicates a cancellation of the transmission occasion of the set of transmission occasions and schedules a dynamic transmission occasion to reschedule a transmission of information associated with the canceled transmission occasion. The operations of 1615 may be performed according to the methods described herein. In some examples, aspects of the operations of 1615 may be performed by a grant reception component as described with reference to FIGS. 6 through 9.

At 1620, the UE may communicate the information with the base station at the dynamic transmission occasion based on receiving the grant. The operations of 1620 may be performed according to the methods described herein. In some examples, aspects of the operations of 1620 may be performed by a communication component as described with reference to FIGS. 6 through 9.

Figure 17:
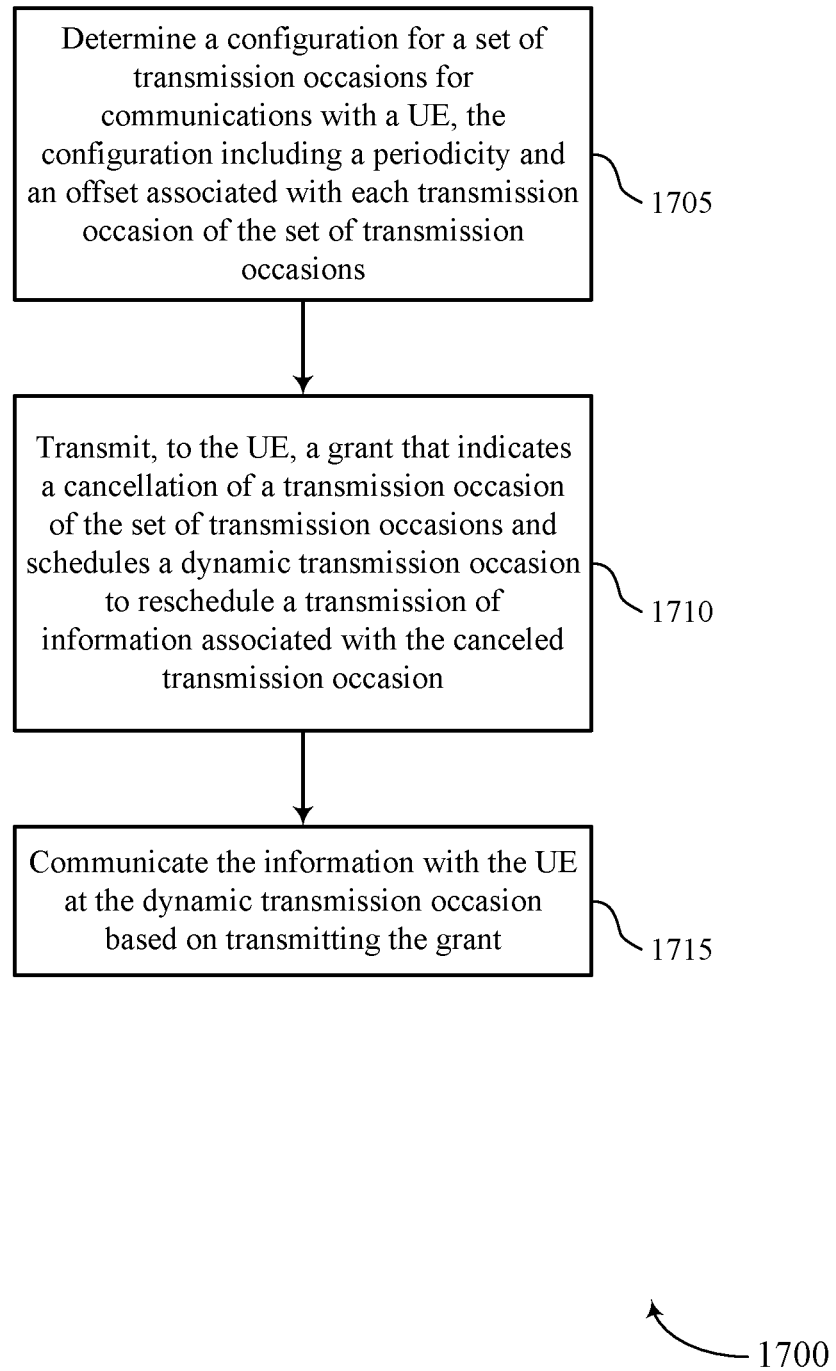

FIG. 17 shows a flowchart illustrating a method 1700 in accordance with aspects of the present disclosure. The operations of method 1700 may be implemented by a base station 105 or its components as described herein. For example, the operations of method 1700 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1705, the base station may determine a configuration for a set of transmission occasions for communications with a UE, the configuration including a periodicity and an offset associated with each transmission occasion of the set of transmission occasions. The operations of 1705 may be performed according to the methods described herein. In some examples, aspects of the operations of 1705 may be performed by an occasion configuration component as described with reference to FIGS. 10 through 13.

At 1710, the base station may transmit, to the UE, a grant that indicates a cancellation of a transmission occasion of the set of transmission occasions and schedules a dynamic transmission occasion to reschedule a transmission of information associated with the canceled transmission occasion. The operations of 1710 may be performed according to the methods described herein. In some examples, aspects of the operations of 1710 may be performed by a grant manager as described with reference to FIGS. 10 through 13.

At 1715, the base station may communicate the information with the UE at the dynamic transmission occasion based on transmitting the grant. The operations of 1715 may be performed according to the methods described herein. In some examples, aspects of the operations of 1715 may be performed by a data communication manager as described with reference to FIGS. 10 through 13.

Figure 18:
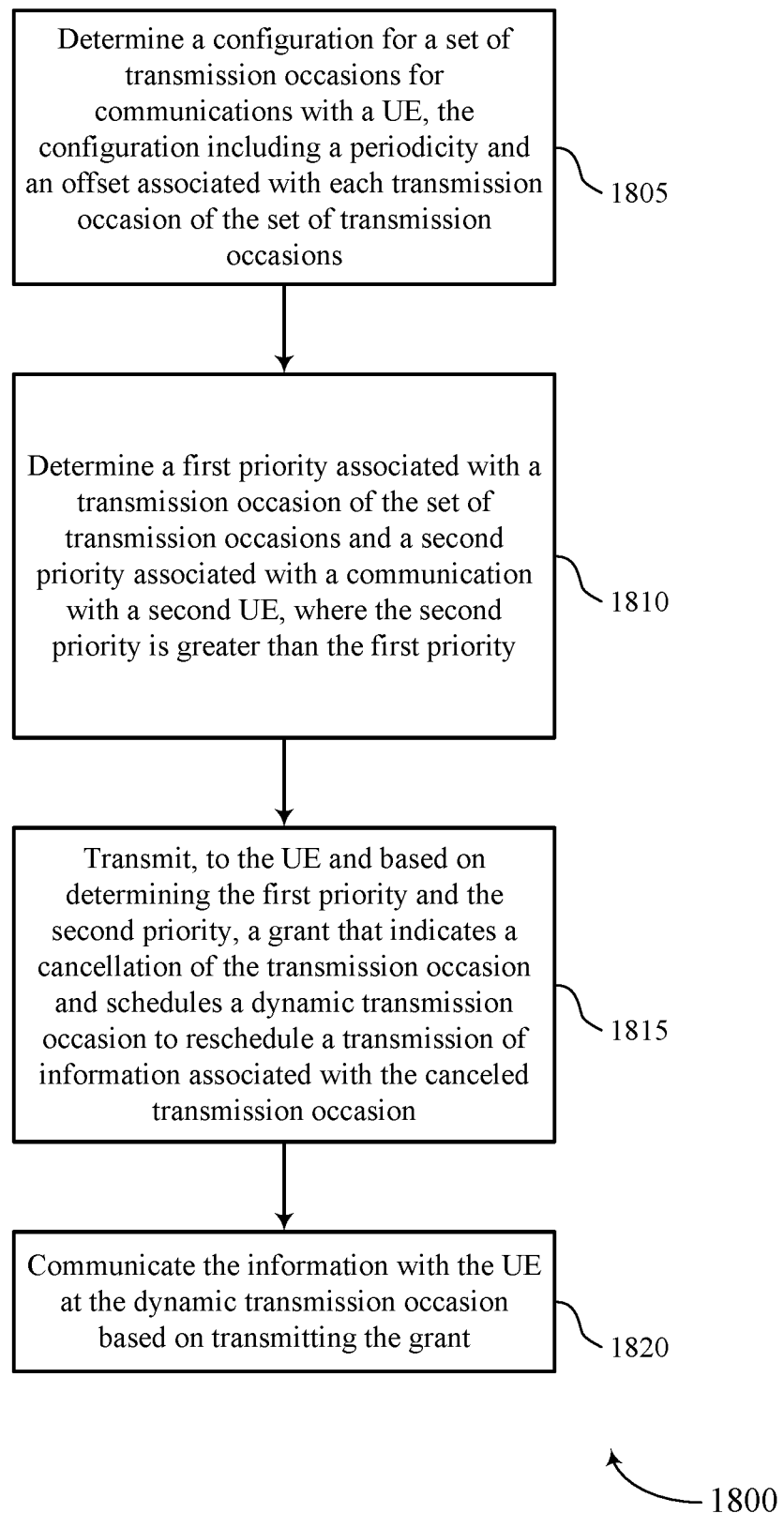

FIG. 18 shows a flowchart illustrating a method 1800 in accordance with aspects of the present disclosure. The operations of method 1800 may be implemented by a base station 105 or its components as described herein. For example, the operations of method 1800 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1805, the base station may determine a configuration for a set of transmission occasions for communications with a UE, the configuration including a periodicity and an offset associated with each transmission occasion of the set of transmission occasions. The operations of 1805 may be performed according to the methods described herein. In some examples, aspects of the operations of 1805 may be performed by an occasion configuration component as described with reference to FIGS. 10 through 13.

At 1810, the base station may determine a first priority associated with a transmission occasion of the set of transmission occasions and a second priority associated with a communication with a second UE, where the second priority is greater than the first priority. The operations of 1810 may be performed according to the methods described herein. In some examples, aspects of the operations of 1810 may be performed by a transmission priority manager as described with reference to FIGS. 10 through 13.

At 1815, the base station may transmit, to the UE and based on determining the first priority and the second priority, a grant that indicates a cancellation of the transmission occasion and schedules a dynamic transmission occasion to reschedule a transmission of information associated with the canceled transmission occasion. The operations of 1815 may be performed according to the methods described herein. In some examples, aspects of the operations of 1815 may be performed by a grant manager as described with reference to FIGS. 10 through 13.

At 1820, the base station may communicate the information with the UE at the dynamic transmission occasion based on transmitting the grant. The operations of 1820 may be performed according to the methods described herein. In some examples, aspects of the operations of 1820 may be performed by a data communication manager as described with reference to FIGS. 10 through 13.

Figure 19:
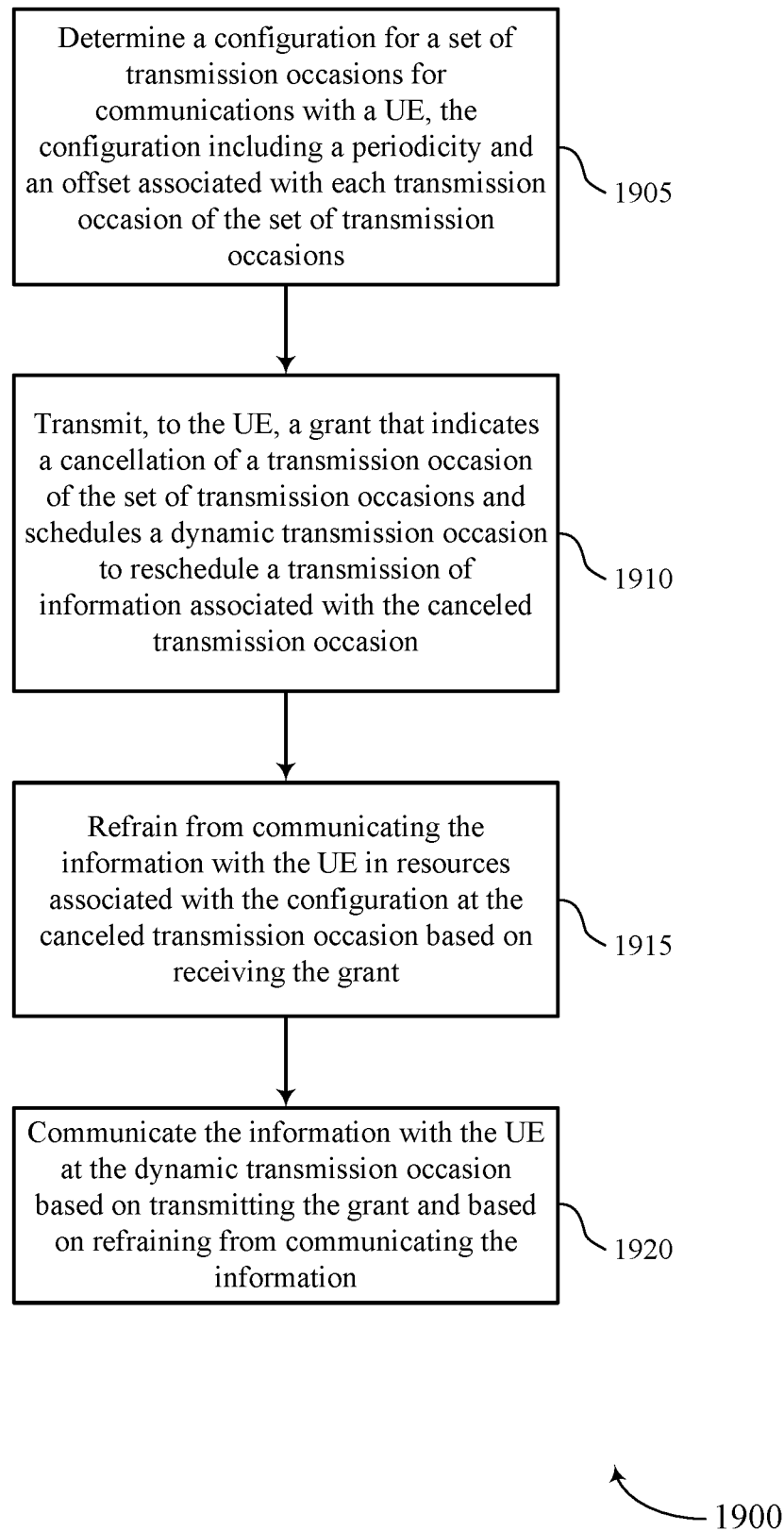

FIG. 19 shows a flowchart illustrating a method 1900 in accordance with aspects of the present disclosure. The operations of method 1900 may be implemented by a base station 105 or its components as described herein. For example, the operations of method 1900 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1905, the base station may determine a configuration for a set of transmission occasions for communications with a UE, the configuration including a periodicity and an offset associated with each transmission occasion of the set of transmission occasions. The operations of 1905 may be performed according to the methods described herein. In some examples, aspects of the operations of 1905 may be performed by an occasion configuration component as described with reference to FIGS. 10 through 13.

At 1910, the base station may transmit, to the UE, a grant that indicates a cancellation of a transmission occasion of the set of transmission occasions and schedules a dynamic transmission occasion to reschedule a transmission of information associated with the canceled transmission occasion. The operations of 1910 may be performed according to the methods described herein. In some examples, aspects of the operations of 1910 may be performed by a grant manager as described with reference to FIGS. 10 through 13.

At 1915, the base station may refrain from communicating the information with the UE in resources associated with the configuration at the canceled transmission occasion based on receiving the grant. The operations of 1915 may be performed according to the methods described herein. In some examples, aspects of the operations of 1915 may be performed by a data communication manager as described with reference to FIGS. 10 through 13.

At 1920, the base station may communicate the information with the UE at the dynamic transmission occasion based on transmitting the grant and based on refraining from communicating the information. The operations of 1920 may be performed according to the methods described herein. In some examples, aspects of the operations of 1920 may be performed by a data communication manager as described with reference to FIGS. 10 through 13.

The following provides an overview of aspects of the present disclosure:

Aspect 1: A method for wireless communications at a user equipment (UE), comprising: determining a configuration for a set of transmission occasions for communications with a base station, the configuration comprising a periodicity and an offset associated with each transmission occasion of the set of transmission occasions; receiving, from the base station, a grant that indicates a cancellation of a transmission occasion of the set of transmission occasions and schedules a dynamic transmission occasion to reschedule a transmission of information associated with the canceled transmission occasion; and communicating the information with the base station at the dynamic transmission occasion based at least in part on receiving the grant.

Aspect 2: The method of aspect 1, further comprising: refraining from communicating the information with the base station in resources associated with the configuration at the canceled transmission occasion based at least in part on receiving the grant, wherein communicating the information with the base station at the dynamic transmission occasion is based at least in part on refraining from communicating the information.

Aspect 3: The method of aspect 2, further comprising: determining an identifier associated with the canceled transmission occasion based at least in part on receiving the grant; and determining that the identifier is associated with the dynamic transmission occasion based at least in part on determining the identifier, wherein refraining from communicating with the base station at the canceled transmission occasion is based at least in part on determining that the identifier is associated with the dynamic transmission occasion.

Aspect 4: The method of aspect 3, wherein the identifier comprises a hybrid automatic repeat request process identifier.

Aspect 5: The method of any of aspects 1 through 4, wherein the received grant comprises one or more bits identifying the canceled transmission occasion.

Aspect 6: The method of any of aspects 1 through 5, further comprising: identifying, in the received grant, an indication of a plurality of canceled transmission occasions, wherein the plurality of canceled transmission occasions comprise the canceled transmission occasion.

Aspect 7: The method of aspect 6, further comprising: refraining from communicating with the base station in resources associated with the configuration at the plurality of canceled transmission occasions based at least in part on receiving the grant.

Aspect 8: The method of any of aspects 6 through 7, wherein the plurality of canceled transmission occasions are consecutive in the set of transmission occasions or non-consecutive in the set of transmission occasions.

Aspect 9: The method of any of aspects 6 through 8, wherein the plurality of canceled transmission occasions are based at least in part on a plurality of cancellations in the indication, the plurality of cancellations based at least in part on a pattern associated with the set of transmission occasions.

Aspect 10: The method of any of aspects 1 through 9, further comprising: receiving a second grant that indicates the UE is to resume communicating with the base station in resources associated with the configuration, wherein communicating with the base station at the dynamic transmission occasion is based at least in part on receiving the second grant.

Aspect 11: The method of any of aspects 1 through 10, wherein determining the configuration comprises: determining a scheduling associated with semi-persistent scheduling (SPS) occasions for downlink transmissions to the UE, wherein the set of transmission occasions comprise a set of SPS occasions for downlink transmissions.

Aspect 12: The method of any of aspects 1 through 11, wherein determining the configuration comprises: determining a scheduling associated with configured grant (CG) occasions for uplink transmissions from the UE, wherein the set of transmission occasions comprise a set of CG occasions for uplink transmissions.

Aspect 13: The method of any of aspects 1 through 12, further comprising: identifying, in the received grant, downlink control information (DCI) that indicates the cancellation and schedules the dynamic transmission occasion, wherein communicating at the dynamic transmission occasion is based at least in part on identifying the DCI.

Aspect 14: The method of any of aspects 1 through 13, wherein the grant that indicates the cancellation of the transmission occasion of the set of transmission occasions and schedules the dynamic transmission occasion to transmit information associated with the canceled transmission occasion for a plurality of UEs, the plurality of UEs comprising the UE.

Aspect 15: The method of any of aspects 1 through 14, further comprising: transmitting a message to the base station requesting to cancel the transmission occasion, wherein receiving the grant is based at least in part on transmitting the message.

Aspect 16: The method of any of aspects 1 through 15, further comprising: determining a set of repetitions associated with the canceled transmission occasion, wherein the indicated cancellation identifies one or more repetitions of the set of repetitions.

Aspect 17: The method of aspect 16, further comprising: refraining from communicating with the base station at the one or more repetitions based at least in part on receiving the grant.

Aspect 18: A method for wireless communications at a base station, comprising: determining a configuration for a set of transmission occasions for communications with a user equipment (UE), the configuration comprising a periodicity and an offset associated with each transmission occasion of the set of transmission occasions; transmitting, to the UE, a grant that indicates a cancellation of a transmission occasion of the set of transmission occasions and schedules a dynamic transmission occasion to reschedule a transmission of information associated with the canceled transmission occasion; and communicating the information with the UE at the dynamic transmission occasion based at least in part on transmitting the grant.

Aspect 19: The method of aspect 18, further comprising: determining a first priority associated with the canceled transmission occasion and a second priority associated with a communication with a second UE, wherein the second priority is greater than the first priority, wherein transmitting the grant is based at least in part on determining the first priority and the second priority.

Aspect 20: The method of any of aspects 18 through 19, further comprising: refraining from communicating the information with the UE in resources associated with the configuration at the canceled transmission occasion based at least in part on receiving the grant, wherein communicating the information with the base station at the dynamic transmission occasion is based at least in part on refraining from communicating the information.

Aspect 21: The method of aspect 20, further comprising: determining an identifier associated with the canceled transmission occasion based at least in part on transmitting the grant; and transmitting an indication in the transmitted grant that the identifier is associated with the dynamic transmission occasion, wherein refraining from communicating with the UE at the canceled transmission occasion is based at least in part on the indication that the identifier is associated with the dynamic transmission occasion.

Aspect 22: The method of aspect 21, wherein the identifier comprises a hybrid automatic repeat request process identifier.

Aspect 23: The method of any of aspects 18 through 22, wherein the transmitted grant comprises one or more bits identifying the canceled transmission occasion.

Aspect 24: The method of any of aspects 18 through 23, further comprising: transmitting, in the transmitted grant an indication of a plurality of canceled transmission occasions, wherein the plurality of canceled transmission occasions comprise the canceled transmission occasion.

Aspect 25: The method of aspect 24, further comprising: refraining from communicating with the UE in resources associated with the configuration at the plurality of canceled transmission occasions based at least in part on transmitting the indication in the transmitted grant.

Aspect 26: The method of any of aspects 24 through 25, wherein the plurality of canceled transmission occasions are consecutive in the set of transmission occasions or non-consecutive in the set of transmission occasions.

Aspect 27: The method of any of aspects 24 through 26, wherein the plurality of canceled transmission occasions are based at least in part on a plurality of cancellations in the indication, the plurality of cancellations based at least in part on a pattern associated with the set of transmission occasions.

Aspect 28: The method of any of aspects 18 through 27, further comprising: transmitting a second grant that indicates the UE is to resume communicating with the base station in resources associated with the configuration, wherein communicating with the UE at the dynamic transmission occasion is based at least in part on transmitting the second grant.

Aspect 29: The method of any of aspects 18 through 28, wherein determining the configuration comprises: determining a scheduling associated with semi-persistent scheduling (SPS) occasions for downlink transmissions to the UE, wherein the set of transmission occasions comprise a set of SPS occasions for downlink transmissions.

Aspect 30: The method of any of aspects 18 through 29, wherein determining the configuration comprises: determining a scheduling associated with configured grant (CG) occasions for uplink transmissions from the UE, wherein the set of transmission occasions comprise a set of CG occasions for uplink transmissions.

Aspect 31: The method of any of aspects 18 through 30, further comprising: transmitting, in the transmitted grant, downlink control information (DCI) that indicates the cancellation and schedules the dynamic transmission occasion, wherein communicating at the dynamic transmission occasion is based at least in part on transmitting the DCI.

Aspect 32: The method of any of aspects 18 through 31, further comprising: transmitting the grant to one or more additional UEs; refraining from communicating with the one or more additional UEs at the canceled transmission occasion based at least in part on transmitting the grant; and communicating with the one or more additional UEs at the dynamic transmission occasion based at least in part on transmitting the grant.

Aspect 33: The method of any of aspects 18 through 32, wherein the transmitted grant indicates one or more second cancellations of one or more second transmission occasions of the set of transmission occasions.

Aspect 34: The method of any of aspects 18 through 33, further comprising: receiving a message from the UE requesting to cancel the transmission occasion, wherein transmitting the grant is based at least in part on receiving the message.

Aspect 35: The method of any of aspects 18 through 34, further comprising: determining a set of repetitions associated with the canceled transmission occasion, wherein the indicated cancellation identifies one or more repetitions of the set of repetitions.

Aspect 36: The method of aspect 35, further comprising: refraining from communicating with the UE at the one or more repetitions based at least in part on transmitting the grant.

Aspect 37: An apparatus for wireless communications at a user equipment (UE), comprising a processor; memory coupled with the processor; and instructions stored in the memory and executable by the processor to cause the apparatus to perform a method of any of aspects 1 through 17.

Aspect 38: An apparatus for wireless communications at a UE, comprising at least one means for performing a method of any of aspects 1 through 17.

Aspect 39: A non-transitory computer-readable medium storing code for wireless communications at a UE, the code comprising instructions executable by a processor to perform a method of any of aspects 1 through 17.

Aspect 40: An apparatus for wireless communications at a base station, comprising a processor; memory coupled with the processor; and instructions stored in the memory and executable by the processor to cause the apparatus to perform a method of any of aspects 18 through 36.

Aspect 41: An apparatus for wireless communications at a base station, comprising at least one means for performing a method of any of aspects 18 through 36.

Aspect 42: A non-transitory computer-readable medium storing code for wireless communications at a base station, the code comprising instructions executable by a processor to perform a method of any of aspects 18 through 36.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
   determining a configuration for a set of transmission occasions for communications with a network device, the configuration comprising a periodicity and an offset associated with each transmission occasion of the set of transmission occasions;
   receiving, from the network device, a first grant that both indicates a cancellation of a transmission occasion of the set of transmission occasions and schedules a dynamic transmission occasion to reschedule a transmission of information associated with the canceled transmission occasion before a next transmission occasion of the set of transmission occasions following the canceled transmission occasion, wherein the first grant indicates that the UE is to refrain from communicating with the network device in resources associated with the configuration until the UE receives a second grant that indicates the UE is to resume communicating with the network device in the resources;
   receiving, after receiving the first grant, the second grant that indicates the UE is to resume communicating with the network device in resources associated with the configuration; and
   communicating the information with the network device at the dynamic transmission occasion based at least in part on receiving the first grant and the second grant.

2. The method of claim 1, further comprising:
   refraining from communicating the information with the network device in the resources associated with the configuration at the canceled transmission occasion based at least in part on receiving the first grant, wherein communicating the information with the network device at the dynamic transmission occasion is based at least in part on refraining from communicating the information.

3. The method of claim 2, further comprising:
   determining an identifier associated with the canceled transmission occasion based at least in part on receiving the first grant; and
   determining that the identifier is associated with the dynamic transmission occasion based at least in part on determining the identifier, wherein refraining from communicating with the network device at the canceled transmission occasion is based at least in part on determining that the identifier is associated with the dynamic transmission occasion.

4. The method of claim 3, wherein the identifier comprises a hybrid automatic repeat request process identifier.

5. The method of claim 1, wherein the received first grant comprises one or more bits identifying the canceled transmission occasion.

6. The method of claim 1, further comprising:
   identifying, in the received first grant, an indication of a plurality of canceled transmission occasions, wherein the plurality of canceled transmission occasions comprise the canceled transmission occasion.

7. The method of claim 6, further comprising:
   refraining from communicating with the network device in the resources associated with the configuration at the plurality of canceled transmission occasions based at least in part on receiving the first grant.

8. The method of claim 6, wherein the plurality of canceled transmission occasions are consecutive in the set of transmission occasions or non-consecutive in the set of transmission occasions.

9. The method of claim 6, wherein the plurality of canceled transmission occasions are based at least in part on a plurality of cancellations in the indication, the plurality of cancellations based at least in part on a pattern associated with the set of transmission occasions.

10. The method of claim 1, wherein determining the configuration comprises:
    determining a scheduling associated with semi-persistent scheduling (SPS) occasions for downlink transmissions to the UE, wherein the set of transmission occasions comprise a set of SPS occasions for the downlink transmissions.

11. The method of claim 1, wherein determining the configuration comprises:
determining a scheduling associated with configured grant (CG) occasions for uplink transmissions from the UE, wherein the set of transmission occasions comprise a set of CG occasions for uplink transmissions.

12. The method of claim 1, further comprising:
identifying, in the received first grant, downlink control information (DCI) that indicates the cancellation and schedules the dynamic transmission occasion, wherein communicating at the dynamic transmission occasion is based at least in part on identifying the DCI.

13. The method of claim 1, wherein the first grant that indicates the cancellation of the transmission occasion of the set of transmission occasions and schedules the dynamic transmission occasion to transmit the information associated with the canceled transmission occasion is for a plurality of UEs, the plurality of UEs comprising the UE.

14. The method of claim 1, further comprising:
transmitting a message to the network device requesting to cancel the transmission occasion, wherein receiving the first grant is based at least in part on transmitting the message.

15. The method of claim 1, further comprising:
determining a set of repetitions associated with the canceled transmission occasion, wherein the indicated cancellation identifies one or more repetitions of the set of repetitions.

16. The method of claim 15, further comprising:
refraining from communicating with the network device at the one or more repetitions based at least in part on receiving the first grant.

17. The method of claim 1, further comprising:
refraining from communicating with the network device in the resources associated with the configuration at a plurality of transmission occasions of the set of transmission occasions until the UE receives the second grant that indicates the UE is to resume communicating with the network device in the resources; and
communicating with the network device in the resources at one or more transmission occasions of the set of transmission occasions following the plurality of transmission occasions.

18. The method of claim 1, wherein the UE receives the first grant before the canceled transmission occasion and the dynamic transmission occasion.

19. A method for wireless communications at a network device, comprising:
determining a configuration for a set of transmission occasions for communications with a user equipment (UE), the configuration comprising a periodicity and an offset associated with each transmission occasion of the set of transmission occasions;
transmitting, to the UE, a first grant that both indicates a cancellation of a transmission occasion of the set of transmission occasions and schedules a dynamic transmission occasion to reschedule a transmission of information associated with the canceled transmission occasion before a next transmission occasion of the set of transmission occasions following the canceled transmission occasion, wherein the first grant indicates that the UE is to refrain from communicating with the network device in resources associated with the configuration until the UE receives a second grant that indicates the UE is to resume communicating with the network device in the resources;
transmitting, after transmitting the first grant, the second grant that indicates the UE is to resume communicating with the network device in the resources associated with the configuration; and
communicating the information with the UE at the dynamic transmission occasion based at least in part on transmitting the first grant and the second grant.

20. The method of claim 19, further comprising:
determining a first priority associated with the canceled transmission occasion and a second priority associated with a communication with a second UE, wherein the second priority is greater than the first priority, wherein transmitting the first grant is based at least in part on determining the first priority and the second priority.

21. The method of claim 19, further comprising:
refraining from communicating the information with the UE in the resources associated with the configuration at the canceled transmission occasion based at least in part on transmitting the first grant, wherein communicating the information with the UE at the dynamic transmission occasion is based at least in part on refraining from communicating the information.

22. The method of claim 21, further comprising:
determining an identifier associated with the canceled transmission occasion based at least in part on transmitting the first grant; and
transmitting an indication in the transmitted first grant that the identifier is associated with the dynamic transmission occasion, wherein refraining from communicating with the UE at the canceled transmission occasion is based at least in part on the indication that the identifier is associated with the dynamic transmission occasion.

23. The method of claim 19, further comprising:
transmitting, in the transmitted first grant, an indication of a plurality of canceled transmission occasions, wherein the plurality of canceled transmission occasions comprise the canceled transmission occasion.

24. The method of claim 23, further comprising:
refraining from communicating with the UE in the resources associated with the configuration at the plurality of canceled transmission occasions based at least in part on transmitting the indication in the transmitted first grant.

25. The method of claim 23, wherein the plurality of canceled transmission occasions are based at least in part on a plurality of cancellations in the indication, the plurality of cancellations based at least in part on a pattern associated with the set of transmission occasions.

26. The method of claim 19, further comprising:
transmitting the first grant to one or more additional UEs;
refraining from communicating with the one or more additional UEs at the canceled transmission occasion based at least in part on transmitting the first grant; and
communicating with the one or more additional UEs at the dynamic transmission occasion based at least in part on transmitting the first grant.

27. The method of claim 19, further comprising:
determining a set of repetitions associated with the canceled transmission occasion, wherein the indicated cancellation identifies one or more repetitions of the set of repetitions.

28. An apparatus for wireless communications at a user equipment (UE), comprising:
a processor; and memory coupled to the processor, the memory comprising instructions executable by the processor to cause the apparatus to:
  determine a configuration for a set of transmission occasions for communications with a network device, the configuration comprising a periodicity and an offset associated with each transmission occasion of the set of transmission occasions;
  receive, from the network device, a first grant that both indicates a cancellation of a transmission occasion of the set of transmission occasions and schedules a dynamic transmission occasion to reschedule a transmission of information associated with the canceled transmission occasion before a next transmission occasion of the set of transmission occasions following the canceled transmission occasion, wherein the first grant indicates that the UE is to refrain from communicating with the network device in resources associated with the configuration until the UE receives a second grant that indicates the UE is to resume communicating with the network device in the resources;
  receive, after receiving the first grant, the second grant that indicates the UE is to resume communicating with the network device in the resources associated with the configuration; and
  communicate the information with the network device at the dynamic transmission occasion based at least in part on receiving the first grant and the second grant.

29. The apparatus of claim 28, further comprising a transceiver, wherein the instructions are further executable by the processor to cause the apparatus to:
  refrain from communicating the information with the network device in the resources associated with the configuration at the canceled transmission occasion based at least in part on receiving the first grant, wherein communicating, via the transceiver, the information with the network device at the dynamic transmission occasion is based at least in part on refraining from communicating the information.

30. An apparatus for wireless communications at a network device, comprising:
  a processor; and
  memory coupled to the processor, the memory comprising instructions executable by the processor to cause the apparatus to:
    determine a configuration for a set of transmission occasions for communications with a user equipment (UE), the configuration comprising a periodicity and an offset associated with each transmission occasion of the set of transmission occasions;
    transmit, to the UE, a first grant that both indicates a cancellation of a transmission occasion of the set of transmission occasions and schedules a dynamic transmission occasion to reschedule a transmission of information associated with the canceled transmission occasion before a next transmission occasion of the set of transmission occasions following the canceled transmission occasion, wherein the first grant indicates that the UE is to refrain from communicating with the network device in resources associated with the configuration until the UE receives a second grant that indicates the UE is to resume communicating with the network device in the resources;
    transmit, after transmitting the first grant, the second grant that indicates the UE is to resume communicating with the network device in the resources associated with the configuration; and
    communicate the information with the UE at the dynamic transmission occasion based at least in part on transmitting the first grant and the second grant.

* * * * *